US008069127B2

(12) United States Patent
Taylor et al.

(10) Patent No.: US 8,069,127 B2
(45) Date of Patent: Nov. 29, 2011

(54) METHOD AND SYSTEM FOR SOLVING AN OPTIMIZATION PROBLEM WITH DYNAMIC CONSTRAINTS

(75) Inventors: Darrin Taylor, Austin, TX (US); Lee Alford, Austin, TX (US)

(73) Assignee: 21 CT, Inc., Austin, TX (US)

( * ) Notice: Subject to any disclaimer, the term of this patent is extended or adjusted under 35 U.S.C. 154(b) by 1102 days.

(21) Appl. No.: 11/789,917

(22) Filed: Apr. 26, 2007

(65) Prior Publication Data

US 2008/0270331 A1 Oct. 30, 2008

(51) Int. Cl.
G06N 3/00 (2006.01)
(52) U.S. Cl. .......................... 706/13; 706/46
(58) Field of Classification Search .................. 706/13, 706/46
See application file for complete search history.

(56) References Cited

U.S. PATENT DOCUMENTS

| | | | |
|---|---|---|---|
| 5,319,781 A | 6/1994 | Syswerda | |
| 5,343,554 A * | 8/1994 | Koza et al. ................ | 706/13 |
| 5,404,516 A | 4/1995 | Georgiades et al. | |
| 5,598,510 A | 1/1997 | Castelaz | |
| 5,701,400 A | 12/1997 | Amado | |
| 5,778,317 A | 7/1998 | Kmisky | |
| 5,787,283 A | 7/1998 | Chin et al. | |
| 5,813,798 A | 9/1998 | Whiffen | |
| 5,848,403 A | 12/1998 | Gabiner et al. | |
| 6,009,394 A | 12/1999 | Bargar et al. | |
| 6,031,984 A * | 2/2000 | Walser ............................. | 703/2 |
| 6,112,304 A | 8/2000 | Clawson | |
| 6,122,572 A | 9/2000 | Yavni | |
| 6,151,566 A | 11/2000 | Whiffen | |
| 6,154,705 A | 11/2000 | McCormack et al. | |
| 6,233,493 B1 | 5/2001 | Cherneff et al. | |
| 6,236,955 B1 | 5/2001 | Summers | |
| 6,310,883 B1 | 10/2001 | Mann et al. | |
| 6,336,110 B1 * | 1/2002 | Tamura et al. ................ | 706/46 |
| 6,389,454 B1 | 5/2002 | Ralston et al. | |
| 6,418,356 B1 | 7/2002 | Oh | |
| 6,490,566 B1 | 12/2002 | Schmidt | |

(Continued)

FOREIGN PATENT DOCUMENTS

WO 2006111821 A3 10/2006

OTHER PUBLICATIONS

International Search Report and Written Opinion of the International Searching Authority for PCT/US2008/61470 dated Aug. 20, 2008.

(Continued)

*Primary Examiner* — David R Vincent
*Assistant Examiner* — Mai T Tran
(74) *Attorney, Agent, or Firm* — J. Roger Williams, Jr.; Andrews Kurth LLP

(57) ABSTRACT

A method and system for solving an optimization problem comprising a plurality of dynamic constraints. A genetic algorithm is used to iteratively generate potential solutions to the problem. A constraint graph is used to model the plurality of dynamic constraints, and any potential solution that does not correspond to a connected subgraph of the constraint graph is infeasible and discarded. Real-time changes in dynamic constraints are incorporated by modification of the constraint graph between iterations of the genetic algorithm. An exemplary embodiment comprising the scheduling of air missions is presented.

29 Claims, 13 Drawing Sheets

U.S. PATENT DOCUMENTS

| | | |
|---|---|---|
| 6,497,169 B1 | 12/2002 | Khosta |
| 6,535,795 B1 | 3/2003 | Schroeder et al. |
| 6,556,978 B1 | 4/2003 | Ginsberg et al. |
| 6,578,005 B1 | 6/2003 | Lesaint et al. |
| 6,581,047 B1 | 6/2003 | Raykhman et al. |
| 6,606,529 B1 | 8/2003 | Crowder, Jr. et al. |
| 6,625,508 B1 | 9/2003 | Purvis |
| 6,678,572 B1 | 1/2004 | Oh |
| 6,694,218 B2 | 2/2004 | Oh |
| 6,744,727 B2 | 6/2004 | Liu et al. |
| 6,769,097 B2 | 7/2004 | Hamlin |
| 6,836,339 B1 | 12/2004 | Purvis et al. |
| 6,850,336 B1 | 2/2005 | Purvis et al. |
| 6,856,411 B1 | 2/2005 | Purvis et al. |
| 6,856,992 B2 | 2/2005 | Britton et al. |
| 6,865,437 B1 | 3/2005 | Babikian et al. |
| 6,876,894 B1 | 4/2005 | Chen et al. |
| 6,907,411 B2 | 6/2005 | Chang et al. |
| 6,952,622 B2 | 10/2005 | Babikian et al. |
| 7,052,919 B2 | 5/2006 | Oh |
| 7,085,726 B1 | 8/2006 | Galperin et al. |
| 7,124,105 B2 | 10/2006 | Hilton |
| 7,672,910 B1 * | 3/2010 | Kumar .......................... 706/13 |
| 2001/0053962 A1 | 12/2001 | Yoshida et al. |
| 2002/0026342 A1 | 2/2002 | Lane et al. |
| 2002/0072893 A1 | 6/2002 | Wilson |
| 2002/0082811 A1 | 6/2002 | Honjas et al. |
| 2002/0100029 A1 | 7/2002 | Bowen |
| 2002/0116239 A1 | 8/2002 | Reinsma et al. |
| 2002/0141342 A1 | 10/2002 | Furman et al. |
| 2002/0141351 A1 | 10/2002 | Maltz et al. |
| 2002/0143926 A1 | 10/2002 | Maltz et al. |
| 2002/0143927 A1 | 10/2002 | Maltz et al. |
| 2002/0143928 A1 | 10/2002 | Maltz et al. |
| 2002/0143929 A1 | 10/2002 | Maltz et al. |
| 2002/0194056 A1 | 12/2002 | Summers |
| 2003/0019350 A1 | 1/2003 | Khosla |
| 2003/0050902 A1 | 3/2003 | Buczak et al. |
| 2003/0051026 A1 | 3/2003 | Carter et al. |
| 2003/0069864 A1 | 4/2003 | Chang et al. |
| 2003/0117971 A1 | 6/2003 | Aubury |
| 2003/0120460 A1 | 6/2003 | Aubury |
| 2003/0120872 A1 | 6/2003 | Aubury |
| 2003/0121010 A1 | 6/2003 | Aubury |
| 2003/0140337 A1 | 7/2003 | Aubury |
| 2003/0154001 A1 | 8/2003 | Oh |
| 2003/0191587 A1 | 10/2003 | Venkataraman et al. |
| 2004/0059696 A1 | 3/2004 | Kropaczek et al. |
| 2004/0102863 A1 | 5/2004 | Yoshida et al. |
| 2004/0136378 A1 | 7/2004 | Barrett et al. |
| 2004/0162638 A1 | 8/2004 | Solomon |
| 2004/0181378 A1 | 9/2004 | Gilmore |
| 2004/0197933 A1 | 10/2004 | Venkataraman et al. |
| 2004/0204869 A1 | 10/2004 | Venkataraman et al. |
| 2004/0215551 A1 | 10/2004 | Eder |
| 2004/0225649 A1 | 11/2004 | Yeo et al. |
| 2004/0258026 A1 | 12/2004 | Lau |
| 2005/0004789 A1 | 1/2005 | Summers |
| 2005/0046584 A1 | 3/2005 | Breed |
| 2005/0193901 A1 | 9/2005 | Buehler |
| 2005/0216182 A1 | 9/2005 | Hussain et al. |
| 2005/0223191 A1 | 10/2005 | Ferris |
| 2005/0251291 A1 | 11/2005 | Solomon |
| 2005/0277444 A1 | 12/2005 | Rensburg et al. |
| 2005/0281270 A1 | 12/2005 | Kossi et al. |
| 2006/0075718 A1 | 4/2006 | Borne et al. |
| 2006/0122881 A1 | 6/2006 | Walker et al. |
| 2006/0190139 A1 | 8/2006 | Reaume et al. |
| 2006/0208169 A1 | 9/2006 | Breed et al. |
| 2006/0217993 A1 | 9/2006 | Anderson |
| 2006/0229817 A1 | 10/2006 | Jacobson |
| 2006/0241986 A1 | 10/2006 | Harper |
| 2006/0253464 A1 | 11/2006 | Thilakawardana et al. |

OTHER PUBLICATIONS

Amendment under Article 34 and Remarks in Response to International Search Report and Written Opinion for PCT/US2008/61470 dated Oct. 20, 2008.

International Preliminary Report on Patentability for PCT/IB2006/000910 dated Oct. 23, 2007.

* cited by examiner

METHOD AND SYSTEM FOR SOLVING AN OPTIMIZATION PROBLEM WITH DYNAMIC CONSTRAINTS

GOVERNMENT LICENSE RIGHTS

This invention was made with Government support under Contract No. FA8750-06-C-0025 awarded by the United States Air Force Research Laboratory. The Government has certain rights in the invention.

BACKGROUND

A genetic algorithm is a heuristic method based on the mechanics of natural selection and genetics that is a powerful tool for finding solutions to optimization problems, i.e., finding optimal (or more optimal) feasible solutions to a problem under a set of objectives and constraints. A solution is "feasible" if it complies with all constraints binding the different variables, and infeasible if it does not comply with all constraints binding the different variables. An "optimal" solution is the most "fit" of the feasible solutions, where the fitness of a solution is determined by how it is scored by a fitness function. In other words, solution A is more fit—better—than solution B under a particular fitness function F if the fitness function F gives a higher score to solution A than to solution B.

A genetic algorithm typically includes generating a population of feasible solutions to a problem, ranking the solutions according to an objective fitness function, selecting some solutions to survive and/or reproduce, replacing or creating new solutions through genetic operators such as mutation (e.g., changing an existing solution or creating a new solution that has properties of other solutions), and iteratively repeating the steps of selection, ranking and creation/replacement until the algorithm terminates. Typically each generation of the algorithm will generate an improved solution, in the sense that the best solution that emerges after each generation is better than the best solution from the prior generation; and when the solutions begin to converge (i.e., when scores of the highest-ranking solutions cease to materially improve), there is a high degree of confidence (assuming a well-designed genetic algorithm) that the genetic algorithm has converged on a solution that is optimal or nearly so, and the algorithm terminates. Because they can efficiently search large, nonlinear and noisy solution spaces, genetic algorithms and associated genetic programming techniques are ideally-suited for solving optimization problems involving a large number of constraints and multiple different, sometimes inconsistent, objectives.

One example of such a problem is the creation of an Air Tasking Order in the context of a wartime air campaign. An Air Tasking Order (ATO) assigns aircraft and munitions to targets, and specifies the timing and grouping of air missions. It implements an air campaign that covers a 24 hour period. There is a planning cycle, the Master Air Attack Plan (MAAP) process, that precedes preparation of each ATO; once the ATO is issued the MAAP process begins again.

Often there are multiple different tactical objectives that must be satisfied by the ATO. For example, the planner may want to maximize a Probability of Destruction (PD) of a target while simultaneously minimizing attrition and mid-air refueling. The planner may also want to prioritize these objectives based on the mission at hand. Alternatively, a planner may consider minimizing attrition to be the top priority in one mission, while minimizing refueling may be of primary importance in another mission. The objectives may also change as the campaign progresses. Early in a campaign, for example, acquiring air supremacy and/or striking previously-known targets may be the highest tactical objectives, whereas later in the campaign the highest tactical objective may be destruction of pop-up targets and other time-sensitive targets (TSTs). Since an air campaign may involve hundreds of targets, dozens of aircraft units, and multiple possibly-competing tactical objectives, the ATO planning problem is a prime candidate for optimization using a genetic algorithm.

SUMMARY

A method is provided of solving an optimization problem comprising dynamic constraints. The method comprises creating a constraint graph corresponding to the dynamic constraints of the optimization problem and generating solutions to the optimization problem using a genetic algorithm. Each solution that does not correspond to a connected subgraph of the constraint graph is discarded. Dynamic constraints can be changed by modifying the constraint graph between iterations of the genetic algorithm. In an embodiment of the method, the optimization problem comprises scheduling a plurality of air missions and solutions are proposed air missions corresponding to a plurality of air mission constraints.

In an alternate embodiment, a method is provided for solving an optimization problem having a plurality of constraints. The method uses a genetic algorithm to generate a population of solutions to the optimization problem, wherein each one of the plurality of solutions to the optimization problem is consistent with each one of the plurality of constraints. The method further comprises the step of, between iterations of the genetic algorithm, modifying a first one of the plurality of constraints and removing from the population each of the plurality of solutions in the population that is not consistent with the modified first one of the plurality of constraints.

A system is provided, comprising a computer with a processing unit, and a memory coupled to the processing unit, the memory storing program instructions that when executed by the processor cause the processing unit to execute steps of creating a constraint graph, generating solutions using a genetic algorithm, discarding each one of the plurality of solutions that does not correspond to a connected subgraph of the constraint graph, and modifying the constraint graph between iterations of the genetic algorithm. A computer readable storage medium is provided comprising instructions for executing the steps of creating a constraint graph, generating solutions using a genetic algorithm, discarding each one of the solutions that does not correspond to a connected subgraph of the constraint graph, and modifying the constraint graph between iterations of the genetic algorithm.

In an alternative embodiment, a system is provided for solving an optimization problem having dynamic constraints, comprising means for retrievably storing a constraint graph corresponding to the plurality of dynamic constraints, means for retrievably storing a plurality of solutions to the optimization problem, wherein each one of the plurality of solutions corresponds to a connected subgraph of the constraint graph, user interface means for outputting one or more of the plurality of solutions, user interface means for receiving a constraint graph modification, means for implementing the constraint graph modification in real time, and genetic algorithm means for optimizing solutions to the optimization problem.

In another alternative embodiment, a system is provided for solving an optimization problem, the system including a computer with memory, a constraint graph corresponding to a plurality of dynamic constraints of the optimization problem, and a processing unit operative to use a genetic algorithm having a plurality of iterations to generate a plurality of candidate solutions to the optimization problem, where each one of the candidate solutions corresponds to a connected subgraph of the constraint graph, and wherein the processing unit can modify the constraint graph between iterations to reflect a change in a dynamic constraint.

BRIEF DESCRIPTION OF THE DRAWINGS

FIGS. 6A through 6E depict exemplary screen shots of an exemplary graphic user interface showing a tree display of a constraint graph and modifications thereto.

DETAILED DESCRIPTION OF PREFERRED EMBODIMENT

The genetic algorithm in an embodiment represents each potential solution to an optimization problem as a chromosome, and a constraint graph is used to help ensure that all chromosomes correspond to feasible solutions. The optimization problem in an embodiment is the scheduling of air missions as in, e.g., creation of an ATO, and each chromosome, in an embodiment, represents a set of air missions.

Identifying whether a particular solution is feasible or infeasible is a constraint satisfaction problem that can be described by a constraint network. A constraint network is a triple <X, D, C> in which is a finite set of variables $X=\{X_0, X_1, \ldots, X_n\}$ with respective domains $D=\{D_0, D_1, \ldots, D_n\}$ containing the possible values for each variable. $C=\{C_0, C_1, \ldots, C_n\}$ is the set of all constraints where each constraint $C_i$ is a relation that imposes a limitation on the values that a variable, or a combination of variables, may be assigned to. A constraint network can be represented as a constraint graph, a graph in which variables are nodes and constraints on or between variables are represented as edges between the nodes associated with the variables. A subgraph of a graph is a graph whose node set (i.e., the set of all nodes) and edge set (i.e., the set of all edges) are subsets of the node set and edge set of the constraint graph. A path in a graph is a sequence of nodes such that from each node in the sequence there is an edge to the next node in the sequence. Two nodes are connected if there is a path between them, and a subgraph is connected if each pair of nodes in the subgraph is connected. In an embodiment, a constraint graph is used to depict elements of a solution of an optimization problem and associated constraints, and potential feasible solutions to the optimization problem correspond to connected subgraphs of the constraint graph.

For a simple optimization problem, all known constraints can be represented by edges in the constraint graph, so that the connectivity of the graph determines feasibility of a solution, and each feasible solution of the problem will correspond to a connected subgraph of the constraint graph. In this instance the set of feasible solutions equals the set of solutions that are not infeasible. For more complex optimization problems, it may be preferable to enforce some constraints through other means outside the graph (such as, e.g., through the operation of genetic operators as described below). For such more complex problems where the edges in the constraint graph do not exhaust the set of constraints, connectivity of the constraint graph determines whether a proposed solution is "not infeasible." In other words, a solution is "not infeasible" only if it corresponds to a connected subgraph of the constraint graph, and the set of "feasible" solutions is a subset, and not necessarily equal to, the set of "not infeasible" solutions.

Exemplary Constraint Graph

Figure 1:
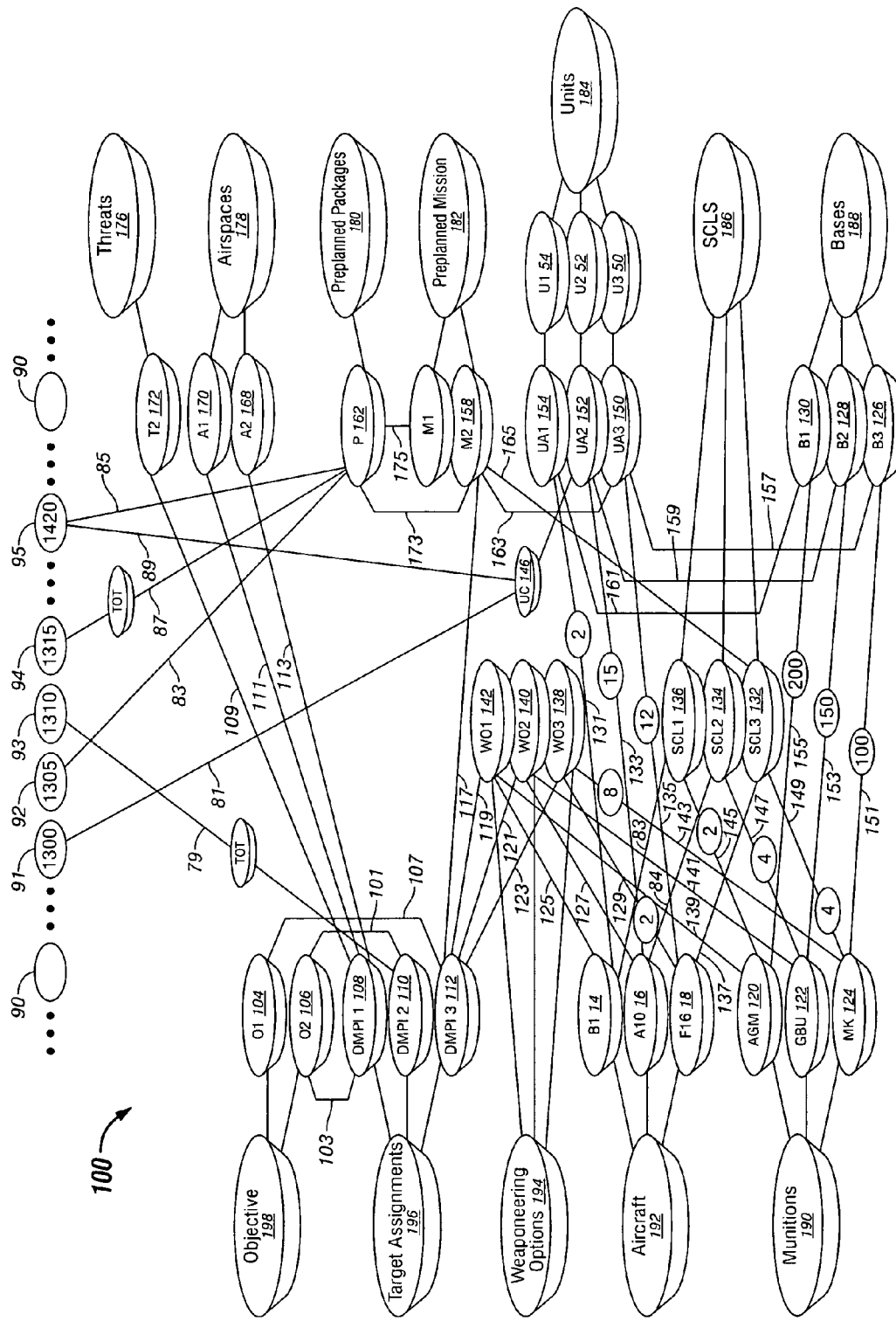
FIG. 1 depicts an exemplary constraint graph for use in a method and system for solving an optimization problem with dynamic constraints.

Constraint graph 100 in FIG. 1 is an example of a constraint graph that depicts elements of a solution to an exemplary ATO planning problem. Shown in constraint graph 100 are top level nodes representing categories of variables of the MAAP process, including, in an exemplary embodiment, objectives 198, assigned targets 196, aircraft 192, munitions 190, weaponeering options ("WO"s) 194, SCLs ("standard configured loads" or "standard conventional loads") 186, bases 188, units 184, pre-planned missions 182, pre-planned packages 180, airspaces 178, and threats 176. (Not depicted are top level nodes for unit associations, unit contracts, and time objects). Also shown in constraint graph 100 are instance nodes representing instances of each category of variables, and edges between instance nodes showing constraints governing the relationships between the instance variables of the MAAP process. Most constraint edges shown in exemplary constraint graph 100 represent a binary "associated with" relationship; some edges also indicate quantitative constraints. Those of skill in the art will appreciate that other types of constraints—quantitative or qualitative—can be represented by edges in a constraint graph without detracting from the invention.

Constraint graph 100 includes nodes representing objectives O1 and O2 (104, 106). Each objective, in one embodiment, is mapped to specific target assignments.

Preferably the constraint graph stores data regarding all planned or plannable known targets in the theater. (A target is also referred to as a "DMPI," meaning designated mean point of impact). However, the number of total potential targets can be very large, and during any particular planning cycle the planner may want to focus missions on a subset of the set of targets. This is accomplished in an embodiment by creating a set of target assignment nodes, with each target assignment node corresponding to a target that is desired to be struck once during the current planning cycle. Constraint graph 100 depicts assigned target instance nodes for DMPI 1 (108), DMPI 2 (110), and DMPI 3 (112) identifying them as assigned targets available for mission planning during the current cycle. As shown by edges 103, 101, and 107 in constraint graph 100, striking targets DMPI 1 (108) and DMP2 (110) satisfies objective O2 (106), and striking target DMPI 3 satisfies objective O1. Use of target assignment nodes in an embodiment enables the planner to identify targets that should be struck several times during a planning cycle by associating multiple target assignment nodes with a single target. A target assignment node is removed, in an embodiment, when the assigned target is included within a pre-planned mission or package, as that target is no longer requires planning.

Constraint graph 100 depicts instances of aircraft 192 representing a B1 bomber (14), A10 close air support vehicle (16) and F16 fighter (18).

Constraint graph 100 depicts instances of munitions category 190 representing AGM (air-to-ground missile) (120), GBU (guided bomb unit)(122), and MK (Mark-xx series gravity bombs) (124).

Weaponeering is the process of estimating the quantity and specific type of weapon required to achieve a specific level of damage to a given target, taking into account attributes of the target, the weapon and delivery system, damage criteria, anticipated effectiveness, and other factors. In the context of constraint graph 100, a weaponeering option is a constraint on a target and describes a recommended combination of aircraft, type of munitions, and total quantity of munitions to be used on the target to achieve a projected PD. During the weaponeering phase of the MAAP process the weaponeer associates one or more weaponeering options with each assigned target and recommends a minimum number of planes that should engage the target.

Exemplary instances of the weaponeering option ("WO") category 194 include WO1 (142), WO2 (140) and WO3 (138). Edges 125 and 139 indicate that weaponeering option WO1 (142) is a B1 (14) carrying air-ground missiles (120), edges 127 and 141 indicate that weaponeering option WO2 (140) is an A10 (16) carrying guided bomb units (122), and edges 129 and 143 indicate that weaponeering option WO3 (138) is an F16 (18) carrying MK gravity bombs (124). As shown by edges 119, 121, and 123 in constraint graph 100, the planners have decided that three different weaponeering options (WO1, WO2 and WO3) can be used for target DMPI 3 (112). Edge 129 in constraint graph 100 also shows that the Weaponeer has recommended that weaponeering option WO3 (138) include two (2) F16s.

An SCL 186 is a constraint on the number of a specific type of munitions that are typically packaged on a particular aircraft. Preferably each aircraft in a mission will have an identical SCL to ensure that all aircraft in the mission share the same range and to simplify logistics. As illustrated by edges 145 and 83, SCL 1 (136) comprises a B1 bomber and contains two (2) AGMs. Similarly, edges 147 and 84 indicate that SCL 2 (134) comprises an A10 carrying 4 GBUs; and edges 149 and 137 indicate that SCL 3 (132) comprises an F16 carrying 4 MK bombs. In some circumstances the number of planes in the recommended weaponeering option is ignored and the actual number is based on the munitions required to strike the target and the SCL chosen to carry the munition. Traditionally, e.g. with non-guided munitions, the desired probability of destruction of a target required specification of a platform (e.g., aircraft) and munition. For some types of guided munitions, however, the probability of destruction depends on the quantity of munitions delivered but not the platform. Thus the planner can select any platform capable of carrying the quantity of munitions, and then the selection of platform is driven by the SCLs available and other user-determined criteria such as, for example, requiring an even number of aircraft in a mission.

Constraint graph 100 shows instances B1 (130), B2 (128), and B3 (126) of the base category 188. Constraint graph 100 illustrates constraint relationships between bases and munitions and between bases and units. Edge 151 indicates that there are 100 MK bombs (124) at base B3 (126), edge 153 indicates that there are 150 GBUs (122) at base B2 (128), and edge 155 indicates that base B1 (130) has 200 AGMs (130).

Constraint graph 100 shows instances of units 184 U1 (54), U2 (52), and U3 (50), unit association UA1 (154), UA2 (152), and UA3 (150),) and unit contract (146). A unit preferably refers to a military organizational unit of a specific kind of aircraft located at a specific base. A unit association is a node in the graph that explicitly associates a particular unit, aircraft type and base.

Unit association nodes facilitate planning and also permit the graph to handle a unit flying a different type of aircraft or temporarily operating out of a different base. As depicted in exemplary constraint graph 100 edges 131 and 161 illustrate unit association UA 1 (154) between unit U1 (54) and an inventory of 2 B1s (14) based at base B1 (130); edges 133 and 159 illustrate unit association UA 2 (152) between unit U2 (52) and an inventory of 15 A10s (16) based at base B2 (128); and edges 135 and 157 illustrate unit association UA 3 (150) between unit U3 (50), and an inventory of 12 F16s (18) based at base B3 (126).

A unit contract reflects constraints on a unit, such as the number of sorties per day or the time windows when the unit is available for sorties. A unit contract is associated with the unit through a unit association node. Each unit typically would have multiple unit contracts during any particular planning window, although only one unit contract node 146 is depicted in exemplary constraint graph 100. The times available for sorties can be represented by edges between the unit contract node and each time object during when the unit is available, or by edges to a start time and end time. Exemplary constraint graph shows unit U2 (52) has a unit contract (146) that allows it to fly sorties between time 1300 (91) and end time 1420 (95) during the planning day.

Constraint graph 100 shows two instances, M1 (160) and M2 (158) of preplanned start (or pre-assigned) missions category 182. As described in more detail below, the planner can accept certain missions, or elements of a mission so that an accepted mission (or elements of a mission) is represented by a pre-assigned mission node in the constraint graph and constrains possible solution candidates during subsequent generations of the genetic algorithm. Edges 163, 165 and 117 of constraint graph 100 illustrate that mission M2 (158) is executed by unit U3 (150) using SCL3 (132) and strikes target DMPI3 (112).

Constraint graph 100 shows one instance—P (162)—of the preplanned packages category 180. A package is a collection of missions. It is often preferable to fly missions together as packages as much as possible because there is safety in numbers to protect the aircraft flying the mission. Edges 173 and 175 indicate that package P (162) includes missions M1 (160) and M2 (158). In an embodiment each package has a start time and an end time, each associated with a time object. Edges 83 and 85 between package P (162) and time objects 92 and 95 show that package P is planned to begin at 1305 hours and end at 1420 hours. In an embodiment each solution candidate contains at least one package for planning purposes, genetic operators may generate solution candidates having packages containing a single mission, and users can supply packages associated with no missions at all as direction for the algorithm to plan. Packages with only one mission are considered in an embodiment to be unpackaged missions and it is user-configurable whether unpackaged missions are allowed in the final solution. As with missions, the planner can accept a package (or elements of a package) so that the accepted package (or elements of a package) is represented by a pre-planned package node in the constraint graph and constrains possible solution candidates during subsequent generations of the genetic algorithm.

Nodes 90 in constraint graph 100 represent time objects. Each time object corresponds to a discretized time interval configured by the planner, preferably 1, 5 or 15 minute intervals. Nodes 91-95 depict specific time objects for 1300 hours (91), 1305 hours (92), 1310 hours (93), 1315 hours (94) and 1420 hours (95).

A TOT (time on target) in an embodiment is a time object associated with a target or with a pre-planned package. A TOT may be associated with a particular target during the target assignment phase of the MAAP planning process. For an illustrative example, the plan may include a strike on a train station, and if the planner wanted to try to disable a train during the same strike, the planner could include with the train station target a TOT corresponding to the time the train is scheduled to be at the station. In constraint graph 100 edge 79 indicates that target DMPI 2 (110) has a TOT at 1310 (93) hours on the plan day. Attack waves can be implemented by restricting the set of available TOT objects. Alternatively a TOT may be associated with a package of missions when the package has been accepted by the planner as a pre-planned package. Preferably the TOT for a package is the rendezvous time for all aircraft in the package and is computed when a stick route is calculated. In constraint graph 100 edge 87 indicates that pre-planned package P 162 has a TOT of 1315 (94) hours on the plan day.

Constraint graph 100 shows instances A1 (170) and A2 (168) of the airspaces category 178. Edges 111 and 113 associate airspaces A1 (170) and A2 (168) with target DMPI 1 (108). Airspace constraints are associated with a specific airspace (i.e., a 3-dimensional space with geographic and altitude coordinates). Preferably one type of airspace is a refueling airspace for in-air refueling. Airspace constraints allow the planner to implement a variety of constraints such as the following illustrative examples: whether escorts are required; whether the airspace is a "no strike" zone; whether the airspace is limited to specific usages; whether specific aircraft or munitions are excluded from the airspace; whether certain services (e.g., Navy) are excluded from the airspace. Each airspace includes a time window when the constraints are valid, preferably represented in constraint graph 100 by edges to time objects (not depicted). Constraint graph 100 shows a threat instance T1 (172) associated (via edge 109) with target DMPI 1 (108). A threat constraint preferably is identified with a geographic region and can indicate the need for specific aircraft or munitions or other procedures or resources for missions striking targets associated with the threat.

Those of skill in the art will readily recognize that the nodes and edges in constraint graph 100 illustrate an exemplary constraint graph that reflects variables, resources and constraints of one exemplary air mission planning problem according to an embodiment, and that in alternative embodiments the constraint graph could use altogether different nodes, edges, and variables without detracting from the essential nature of the invention. For an illustrative example, an alternative embodiment might include constraint graph nodes corresponding to aircraft, flight crew assignments, bases, destinations, arrival times and take-off times as essential elements for scheduling of commercial air flights.

When the planning problem is modeled as a constraint graph as in the present embodiment, each feasible solution must correspond to a connected subgraphs of the constraint graph. For an illustrative example, each viable solution to the ATO planning problem preferably contains at least one package, which has a start and end time, containing at least one mission striking at least one target with at least one aircraft and type of munitions, a weaponeering option corresponding to the target, an SCL corresponding to the aircraft and the munitions, and a base and unit associated with the aircraft, munitions, and mission. Thus a feasible solution to the exemplary ATO planning problem represented by constraint graph 100 must correspond to a connected subgraph of constraint graph 100 that includes at least one instance node for each of the following categories of variables: target 196; weaponeering option 194; aircraft 192; munitions 190; SCLs 186; bases 188; units (184). Other categories of variables depicted in constraint graph 100 (e.g., threats 176, airspaces 178) may constrain possible solutions, but are not necessarily part of a feasible solution.

Some constraints can be represented as edges between nodes of the same category. For an illustrative example, the constraint graph could include edges between all DMPIs that are within the mission diameter from each other. This ensures fast lookup when a genetic operator seeks to add additional missions within the mission diameter of a target or to create a bomber mission involving multiple targets.

Several benefits accrue from using a constraint graph to model the variables and constraints of the ATO problem and other optimization problems. One significant benefit is speed of processing. A graph-based representation of constraints ensures that traversal of constraint edges will be fast due to the connectivity of the graph.

Another benefit is that respecting the connectivity of the graph ensures that infeasible solutions are not generated from genetic operators. Any potential solution that does not respect the connectivity of the graph is discarded as infeasible, which reduces the size of the solution space and enhances rapid convergence to better solutions.

Another benefit is flexibility and the ability to respond to changes in dynamic constraints in real time. The constraint graph in an embodiment can be user-modified without redesign, recoding or recompilation of hard-coded constraints by manipulating the topology (nodes or edges) of the graph; and because the topology of the constraint graph can be modified in real-time, the genetic algorithm can respond to changes to dynamic constraints in real time. Similar benefits accrue from using pluggable components to implement other constraints genetic algorithm components.

Another benefit is ease of implementation. The processes and software tools required to create, maintain, and use graphs are well-known to those of ordinary skill in the art. Also, it is well-known to those of ordinary skill in the art that the constraint graph can be implemented in a variety of equivalent data structures, including an adjacency matrix, an adjacency list, or other custom-designed databases or other data structures.

Yet another benefit is transparency and information retrieval. Certain user-queries can be made more efficiently using a graph representation than alternative embodiments (such as a conventional database). For example, the constraint graph can be easily traversed to rapidly connect indirect links between DMPIs (targets) through weaponeering options to aircraft to units to the bases that house the units attacking the targets. The top-level nodes serve as convenient entry points into the constraint graph for purposes of such an inquiry.

Overview of System Components

Figure 2:
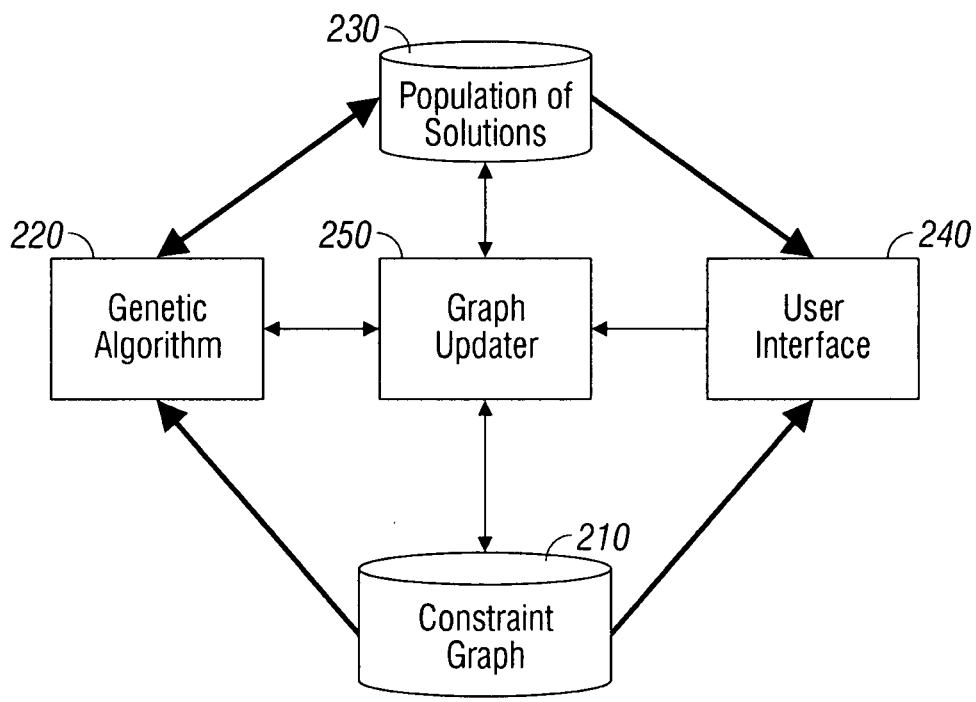
FIG. 2 depicts a high-level view of the components of an exemplary system for solving an optimization problem with dynamic constraints.

FIG. 2 depicts a high-level view of the components of an exemplary system for solving an optimization problem with dynamic constraints. The hardware for such a system (which is not depicted) includes one or more computers each having one or more processors (such as, in an embodiment, a Dell Precision workstation with a 2.5 GHz Intel dual processor), 2 GB (preferably) of internal RAM or other memory, media for storage such as a hard disk drive, CD-ROM, and flash drives; display means such as a monitor or other display device; and/or user input means such as a keyboard, mouse and/or touchpad. Those of ordinary skill in the art will understand that the system described herein could be equivalently implemented using one or more computers, each with one or more processing units (i.e., single-core or multi-core processors or processors operating in parallel), some or all of which may be located remotely and connected via distributed data network, LAN, the World Wide Web, the internet, or other network using network protocols known to those of skill in the art.

The system depicted in FIG. 2 includes media storage means 210 for storing the data structures embodying constraint graph 100 and media storage means 230 for storing the data structures containing all the chromosomes corresponding to the population of solutions. Media storage means 210 and 230 include RAM, hard-disk drives, CD-ROMs, and other memory and media familiar to those of skill in the art. Constraint graph 100 and the population of chromosomes preferably are stored in RAM during operation of the methods described herein. Media storage means 230 stores data regarding the population of solutions for each generation of the genetic algorithm, including preferably the highest-ranked solution for each generation and any solutions in which the planner takes an interest. The results of the planning activity and the status of the constraint graph and graph changes are saved to media storage means 230 for the purpose of after-action review and forensic analysis. Media storage means 230 and 250 in a current embodiment are embodied in a single hard disk drive in one local computer, but in an alternative embodiment could equivalently be distributed among one or more disks or other storage means coupled to computers co-located locally or remotely and interconnected by ethernet or other LAN, the world wide web, the internet or other network, all using network or storage protocols known to those of ordinary skill in the art.

The system also includes means 220 for implementing the steps of the genetic algorithm, user interface 240, and graph updater 250. In an embodiment the processes of genetic algorithm means 220, user interface 250 and graph updater 250 are embodied in Java software, with some routines (e.g., an arraycopy function) written natively. Those of ordinary skill in the art will appreciate that the instructions for operating the method and system can be equivalently implemented in C++ or any equivalent code. The programming code preferably is augmented with database management software (such as, for example, postgreSQL) for tracking changes to the constraint graph. Those of ordinary skill in the art will recognize that any or all of the processes of genetic algorithm means 220, user interface 250 and graph updater 250 can be implemented together or independently on one or more processing units, can be readily adapted for parallel processing using multiple processing units, either locally or distributed, can be implemented in a multi-user version, and all or part of the functionality could be implemented in application specific integrated circuits, field programmable gate arrays or other special purpose hardware without changing the essential nature of the invention. In an embodiment user interface 240 includes a display monitor, keyboard, and mouse (not depicted) locally coupled to the computer. Those of ordinary skill in the art will recognize that the display monitor, keyboard, and mouse may also be coupled remotely using web-based or other network protocols.

Genetic Algorithm—Prior Art

Figure 3:
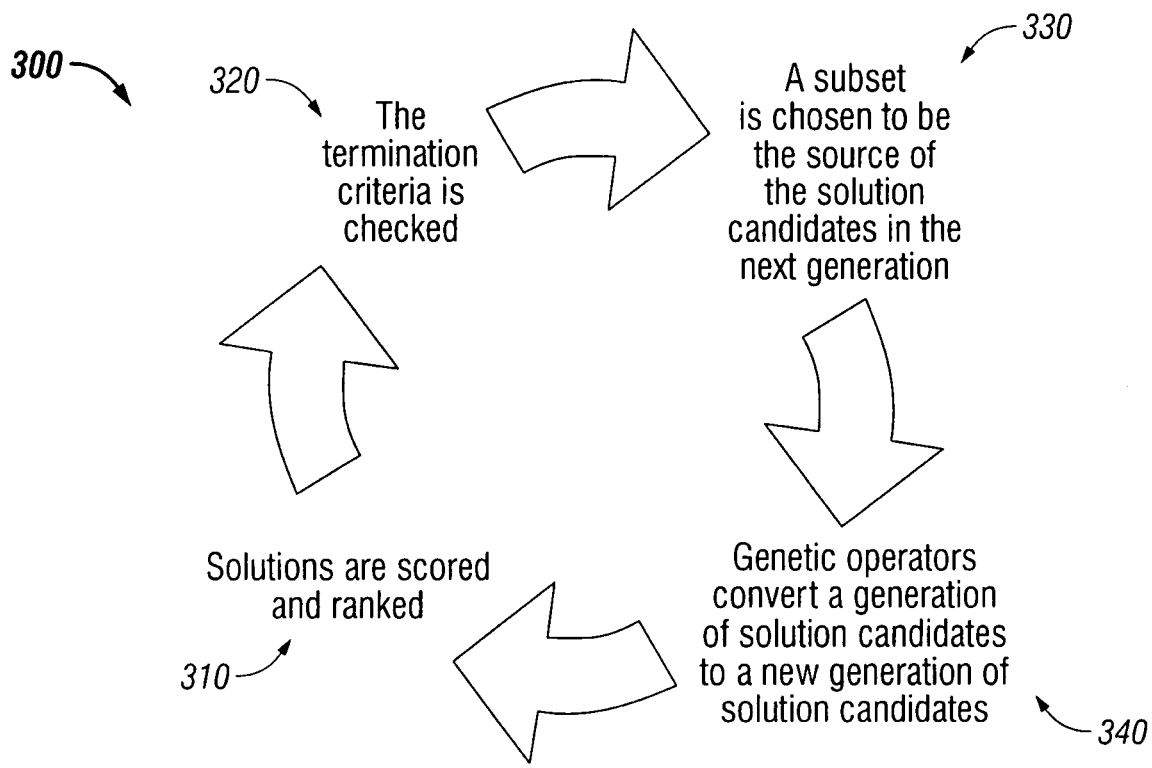
FIG. 3 depicts a prior art version of an exemplary genetic algorithm method.

FIG. 3 depicts an exemplary conventional genetic algorithm method known in the prior art and useful for solving problems with static constraints. The preparatory step, not depicted in FIG. 3, is the creation of the initial population of chromosomes corresponding to solution candidates. In step 310 the solution candidates are scored using a user-defined fitness function and ranked. In step 320 a termination criterion is checked, and the algorithm terminates if the termination condition is satisfied. The termination condition checked in step 320 could refer a predetermined number of iterations of the algorithm, a specified time interval, or a determination that the solutions have sufficiently converged (according to a user-defined metric) on an optimal solution. In step 330 a subset of the population is selected to "survive," i.e., to continue to the next generation, and the subset of the population that does not survive is removed from the population. Preferably the chromosomes that survive are more "fit"—as determined by the fitness function—than those that are removed. In step 340 new chromosomes are generated using genetic operators that facilitate reproduction of new members of the population and are added to the population. The cycle continues with the scoring and ranking of all solution candidates in step 210. In such a prior art embodiment, the variables and constraints of the problem do not change during the operation of the algorithm and the steps of the algorithm 300 can be performed on a batch basis.

Process Flow

Figure 4:
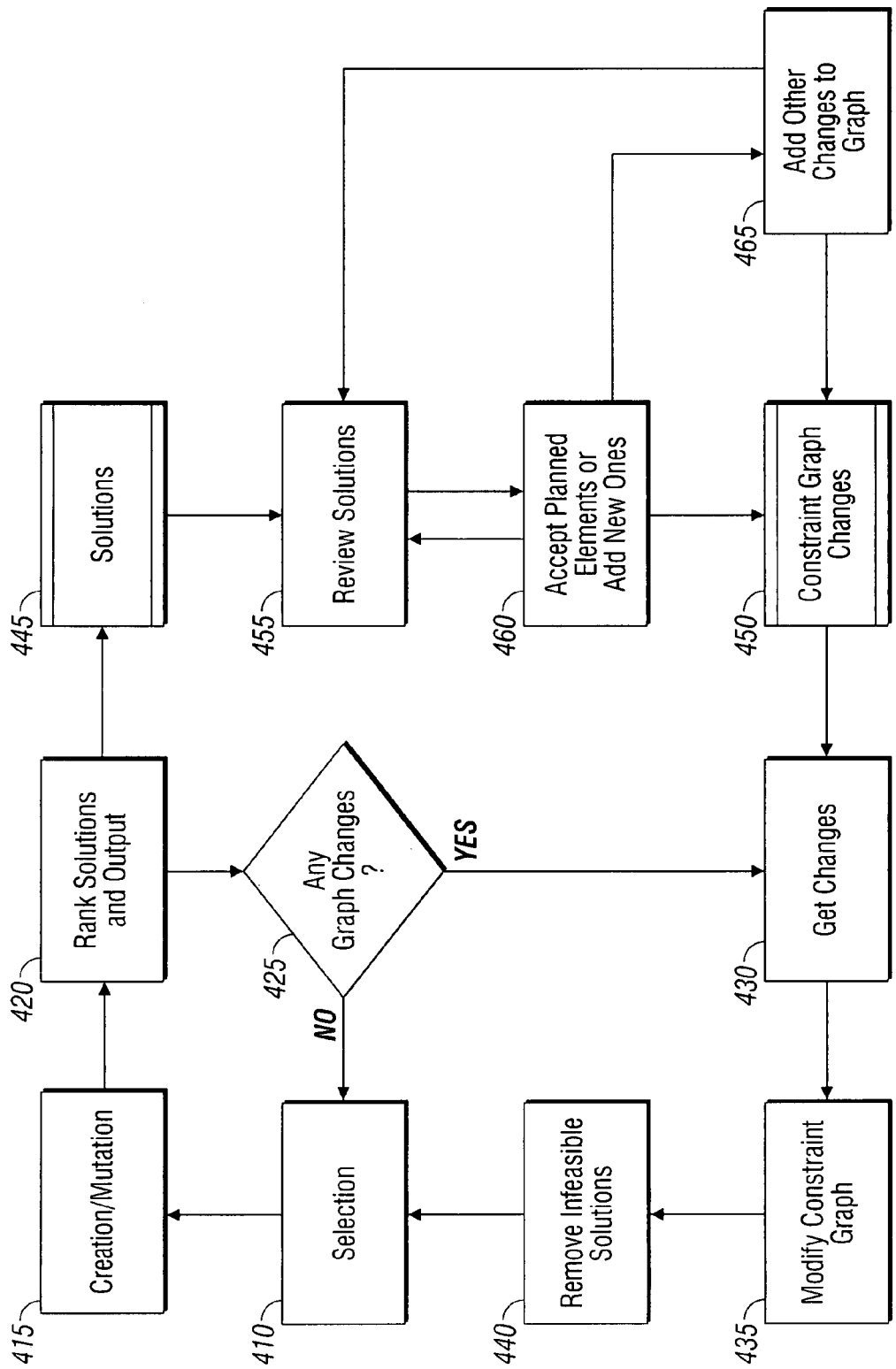
FIG. 4 depicts the process flow of an exemplary method of solving an optimization problem with dynamic constraints.

FIG. 4 depicts the process flow of an exemplary method of solving an optimization problem with dynamic constraints. Steps 410, 415 and 420 are similar to the steps of the prior art genetic algorithm depicted in FIG. 3. In Selection step 410 a subset of the population of chromosomes is selected to survive. In the event the population is empty, nothing happens in step 410. The population could be empty at step 410 if, for example, it is the initial iteration of the algorithm or, for another example, if previous changes to the constraint graph have resulted in the removal of all previously-generated chromosomes. If the population is empty in step 410 it will be populated (or re-populated) in step 415.

Preferably the more "fit" the chromosome, the more likely it will survive to the next generation. In addition, the more fit the gene, the more likely it is that the gene will be used to create the next generation of solutions. In an embodiment, the chromosomes are ranked (based on the scores under the fitness function) and one of several pluggable selection algorithms can be used to determine the chromosomes which will serve as parents for the next generation. Pluggable selection algorithms include roulette selection and top percent selection, but tournament selection and others can be used as well. In an embodiment, some chromosomes are marked as elite allowing them to pass unaltered into the next generation. Typically this would include the most fit chromosome but may include other chromosomes with features desirable to preserve in the population. In an embodiment, the selection component of the genetic algorithm, i.e., the criteria that determine which solutions survive and which solutions mutate or mate, is "pluggable" via software plug-in, hardware plug-in (e.g., ROM, EEPROM, application specific integrated circuits, field programmable gate arrays or other special purpose hardware) or remote access (e.g., to a web site) to facilitate user-customization of the selection criteria.

In Creation/Mutation step 415 additional chromosomes are created or added to the population through operation of genetic operators. In an embodiment, the population of chromosomes is initially empty and is populated through the use of genetic operators. Preferably the fully-populated population will contain 10-50 chromosomes. In subsequent iterations the population of solution candidates is not typically empty, and genetic operators are used to add additional chromosomes (by creation, mutation or crossover) until the population of solutions is re-populated at a preferable size. Operation of exemplary genetic operators is described in more detail below.

In Ranking step 420 the solution candidates in the population are ranked according to their score under the fitness function. The ranking is a measure of relative fitness under the fitness function. In an embodiment the solution candidate is scored at the Creation/Mutation step and the chromosomes are sorted based on the score. Details of exemplary fitness functions in an embodiment are described below.

In an embodiment, step 410 is the beginning of each generation of the genetic algorithm and step 420 is the end of each generation. In step 420, data about the population of solutions 445 are provided to the planner for review in Review Solutions step 455.

Review Solutions step 455 in FIG. 4 is the step where the current population of solutions 445 can be evaluated. Preferably the solutions are evaluated by a human operator, but an embodiment may also permit automatic evaluation by, for example, a process implemented in software. Preferably the highest ranked solution is displayed via a monitor or other display device to the planner, and information about all the solutions in each generation are stored so that the planner can review and/or use solutions from the most recent completed generation or previously-completed generations.

There is tension between the goals of finding the optimal solution to the planning problem and the ability to modify the graph in real time to reflect changes in dynamic constraints. The highest-ranked solution that is displayed at the end of each generation may be the best solution for that generation of solution candidates, but it may not be the optimal solution for the current state of the constraint graph. Finding the optimal solution for the current state of the constraint graph may require many more generations of the genetic algorithm without modification of the constraint graph.

Preferably a graphical user interface (GUI) is provided that displays the components of solution candidates in a way that facilitates quick review of the features of interest by the planner. A GUI in an embodiment displays the data elements in each chromosome in a nested tree format so that the planner can inspect the sub-elements of whichever element of the chromosome is of interest.

In step 460, previously-planned elements of a solution are accepted or removed or new ones are added. For an illustrative example, a proposed solution may include a package that includes a mission that strikes a DMPI of special interest. If the planner wants to ensure that this particular mission will be part of the plan, the planner can select and accept this mission using preferably a GUI. In an embodiment the planner can add a new element to the plan. Preferably elements from one chromosome cannot be added to a different chromosome because internal consistency is only enforced at the chromosome level. If a plan element is accepted at step 460 it will become a constraint with respect to planning future generations of solutions. The constraint graph will be modified to add it as a constraint, and each subsequent solution candidate will be constrained by the accepted plan elements.

Preferably a plan element that has been accepted in the graph cannot be altered by action of the genetic operators except under special circumstances. One such circumstances in an embodiment is in the context of a consistency check of the entire graph, which preferably occurs when certain changes are made to the graph. For example, a mission that has been accepted into the constraint graph might have to be removed if the mission relies on resources (e.g., a base) that is removed from the graph. Another such circumstance when an accepted element of the graph might be modified would be as required by time-critical processing. For example, a genetic operator trying to build a mission to strike a time-critical target may be authorized re-allocate resources from an accepted mission or package element to strike the target.

In step 465 the planner can make other changes to the constraint graph. Preferably any configurable element of the constraint graph can be modified, and particular constraints can be added or deleted. The following is a non-exhaustive list of exemplary events that might trigger modification of constraint graph 100 according to an embodiment: (i) changes in the state of objectives, such as adding new objectives to replace objectives that have been achieved, or forcing a re-plan for objectives that have not been achieved; (ii) changes in resources, such as loss of resources due to battle damage or supply delays, or additional resources due to passage of time or redeployment or improvement in logistics process; (iii) discovery of new targets, including "pop-up" or time-critical targets, or deletion of destroyed targets; (iv) changes in the status of an airspace; and (v) discovery of a new threat.

Figure 5:
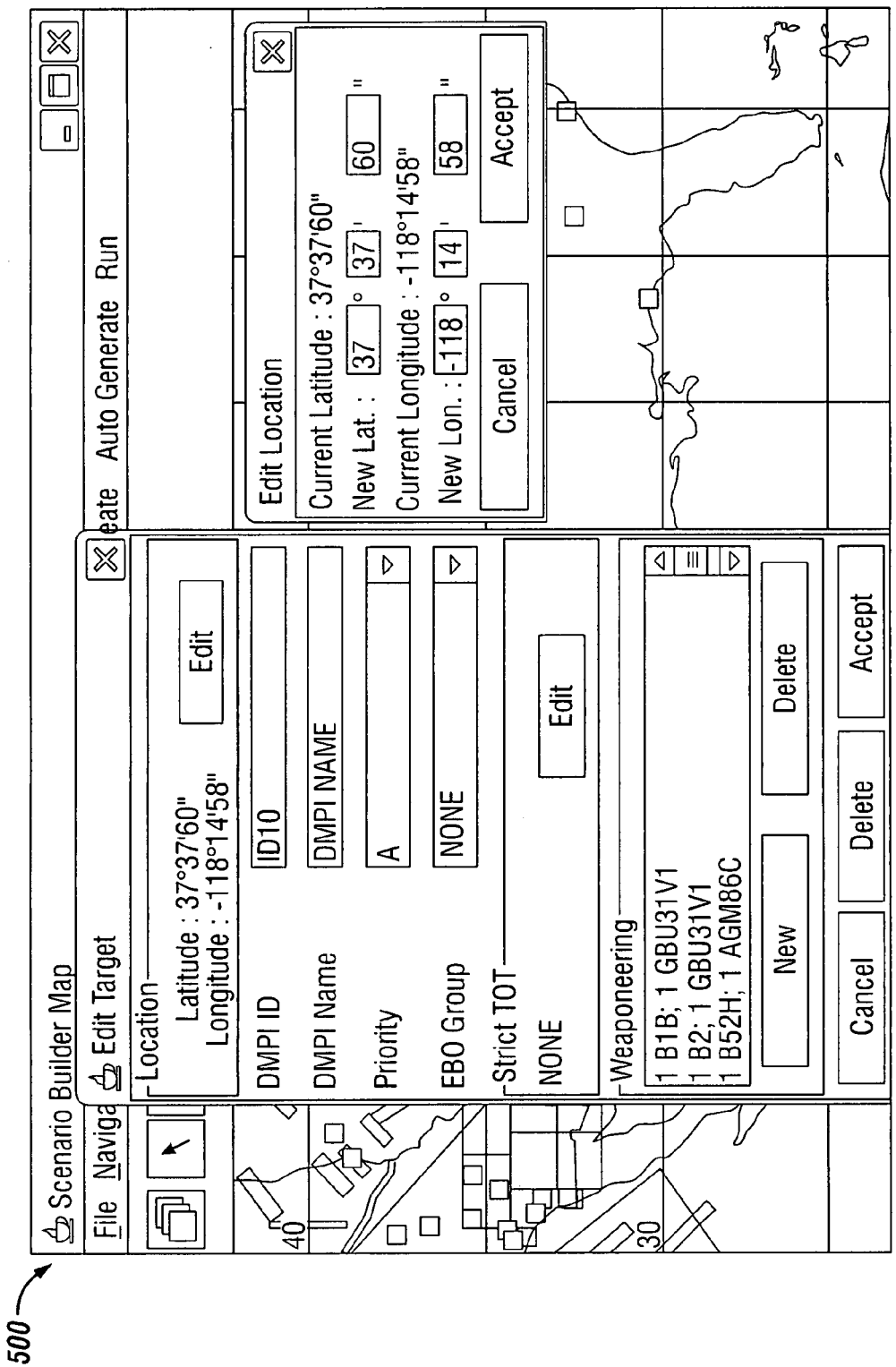
FIG. 5 depicts an exemplary screen shot of an exemplary graphic user interface for adding or modifying data relating to a target.

Preferably the changes are made using a conventional GUI that includes windows, buttons, text boxes, list boxes, drop down lists, option lists, scroll bars, check boxes, radio buttons, maps and grids. FIG. 5 depicts an exemplary screen shot of an exemplary graphic user interface for adding or modifying data relating to a target. A target can be created by using a mouse to point and click on a map in target creation mode (which will automatically determine the coordinates) or by inputting the actual coordinates. GUI 500 permits the planner to modify the location data, associate a strict TOT with the target, and identify the priority, weaponeering option, and objectives associated with the target.

Preferably the actions in steps 460 and 465 can be performed by a human user planner or automatically by operation of a software planning agent or other software process. Because some constraints begin or end at a specific time, an automatic process in an embodiment can ensure that such constraints are added or removed at the appropriate times. For example, if a package P has an associated end time T, package P, and all preplanned missions within P, will be automatically removed from any constraint graph generated for times after time T. Similarly, a unit contract UC for a particular fighter unit may allow sorties beginning at time $T_j$ and ending at time $T_{j+1}$; consequently the constraint graph will be automatically modified to add unit contract UC as an available resource for all times between $T_j$ and $T_{j+1}$.

Past generations of solution candidates 445 are stored for subsequent use of modification by the planner. For an illustrative example, while the planner is inspecting the highest ranked solution from generation j, the genetic algorithm is continuing to generate solution candidates. By the time the planner decides to accept an element (e.g., a mission) of the highest ranking solution in generation j, the genetic algorithm may be on a different generation, j+25 for example, and the chromosome that was the highest ranked solution in generation j may no longer be the highest-ranked, or may no longer exist in the population, as of generation j+25. Because the past generations of solution candidates have been stored, however, the data relating to the desired mission is available to be accepted and made into a constraint for future generations. The planner can continue to review solution candidates, from previous generations or the most recently completed generation, after accepting elements of a solution candidate in step 460 or modifying the constraint graph in step 465.

Steps 460 and 465 generate constraint graph changes 450, preferably encoded in an XML file. In an embodiment the constraint graph changes 450 are stored in a queue for implementation between generations by graph updater 250 (FIG. 2).

The changes to the constraint graph preferably are logged with past generations of solution candidates so that changes can be historically tracked and the constraint graph can be reverted to its state at any particular point in time.

Steps 425, 430, 435, and 440 in FIG. 4 depict the process of updating the constraint graph between generations of the genetic algorithm in an embodiment. Step 425, which occurs at the end of a generation of the genetic algorithm, checks to see if there are any constraint graph changes to be made. If there are no changes, the genetic algorithm resumes and starts a new generation with Selection step 410.

If there are changes to the constraint graph, the operation of the genetic algorithm is suspended until all the pending changes are processed. In step 430, constraint graph changes 450 are collected from the queue and in step 435 the constraint graph is modified to reflect the changes. Preferably all pending changes are made so that the queue is emptied. In step 440, all solution candidates are examined for consistency with the modified constraint graph and other constraints. Solution candidates that no longer correspond to a connected subgraph of the constraint graph 100 as modified are removed from the population or mutated to become feasible. The remaining solution candidates are re-scored under the fitness function and re-ranked. The process of re-scoring will result in removal or mutation of solution candidates that are inconsistent with the additional constraints that are not reflected in the constraint graph, and the process of re-ranking will prepare the solution candidates for selection. When all solution candidates in the population are consistent with the constraint graph and other constraints as modified, the genetic algorithm will resume again with Selection step 410.

FIGS. 6A through 6E depict exemplary screen shots of an exemplary graphic user interface showing a tree display of a constraint graph and modifications thereto.

Figure 6A:
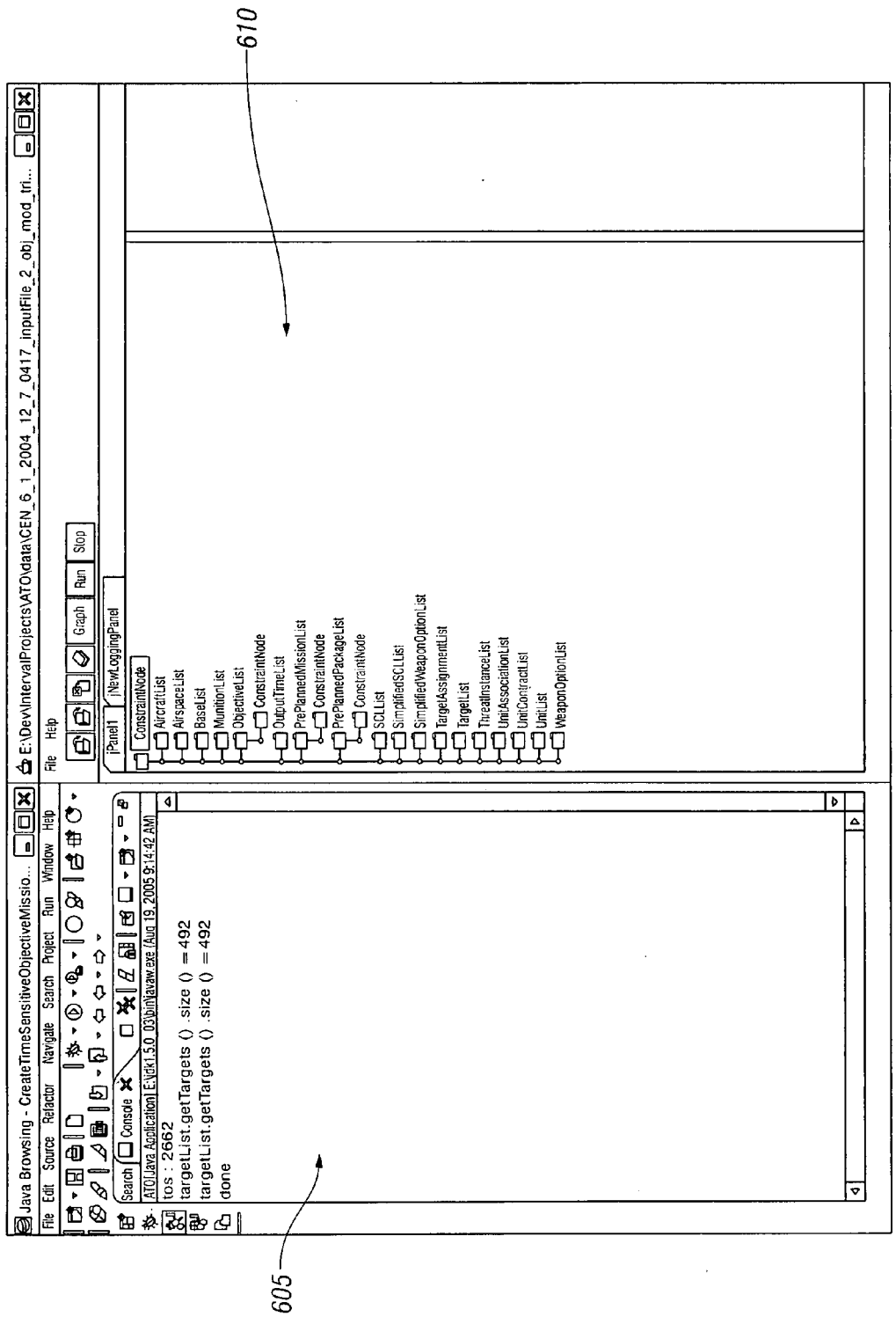

FIG. 6A shows console view 605 and tree display 610 views of an exemplary constraint graph immediately after the initial data has been loaded but before the system has started running. At this point there are no objectives, missions, or packages depicted in tree display 610, and console view 605 shows 492 total targets. The icons depicted in tree display 610 correspond to the variable type nodes in constraint graph 100, and provide a user interface that allows the planner to easily determine the constraints affecting each type of variable by clicking on the variable icon.

Figure 6B:
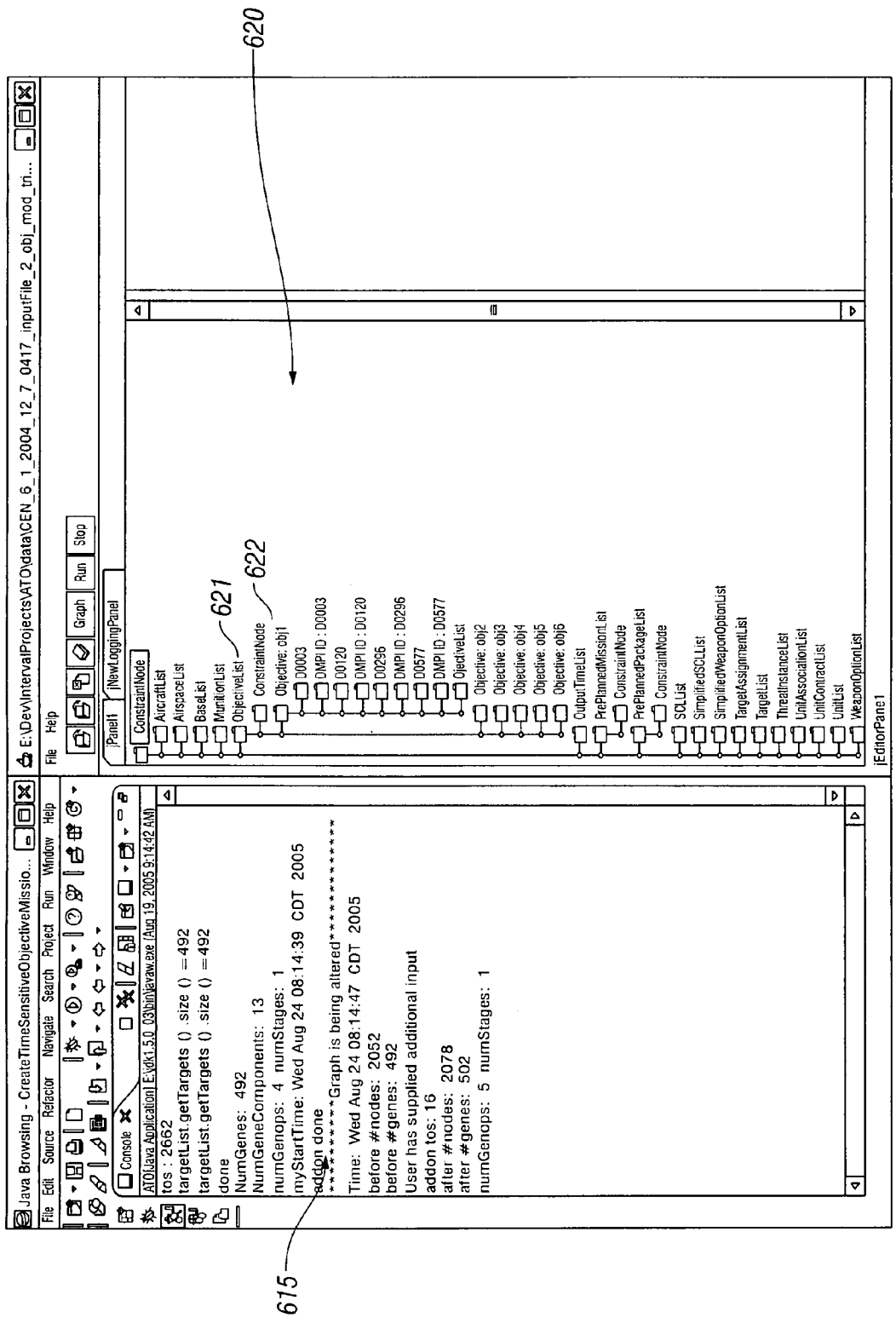

After the system has started running, new data can be added to the constraint graph. FIG. 6B shows the addition of 6 objectives. In tree display 620, ObjectiveList icon 621 now has objectives; and under 'Objective: obj1' icon 622 are displayed the DMPIs that are associated with that objective. Console view 615 tracks the changes for the planner.

Figure 6C:
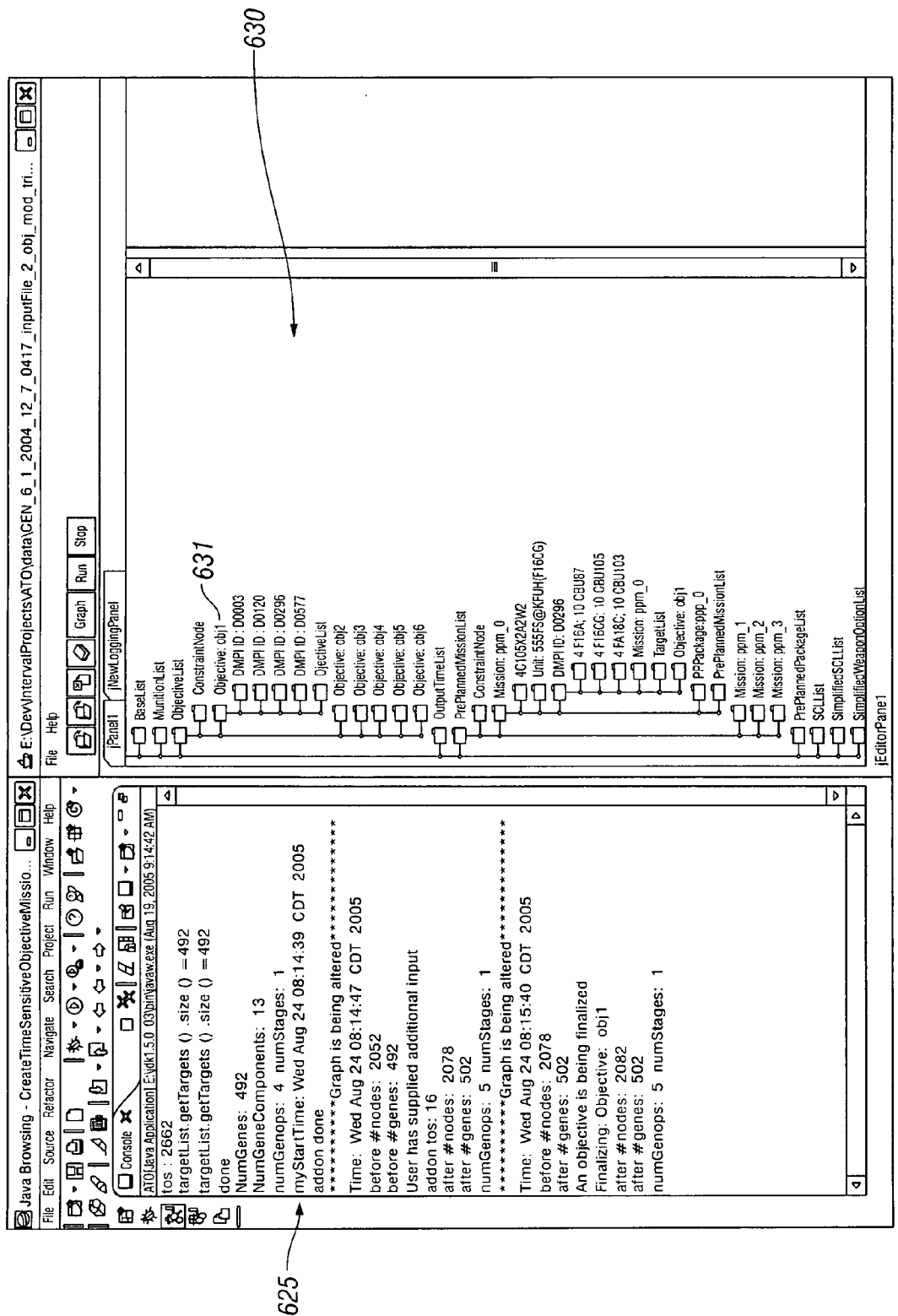
Figure 6D:
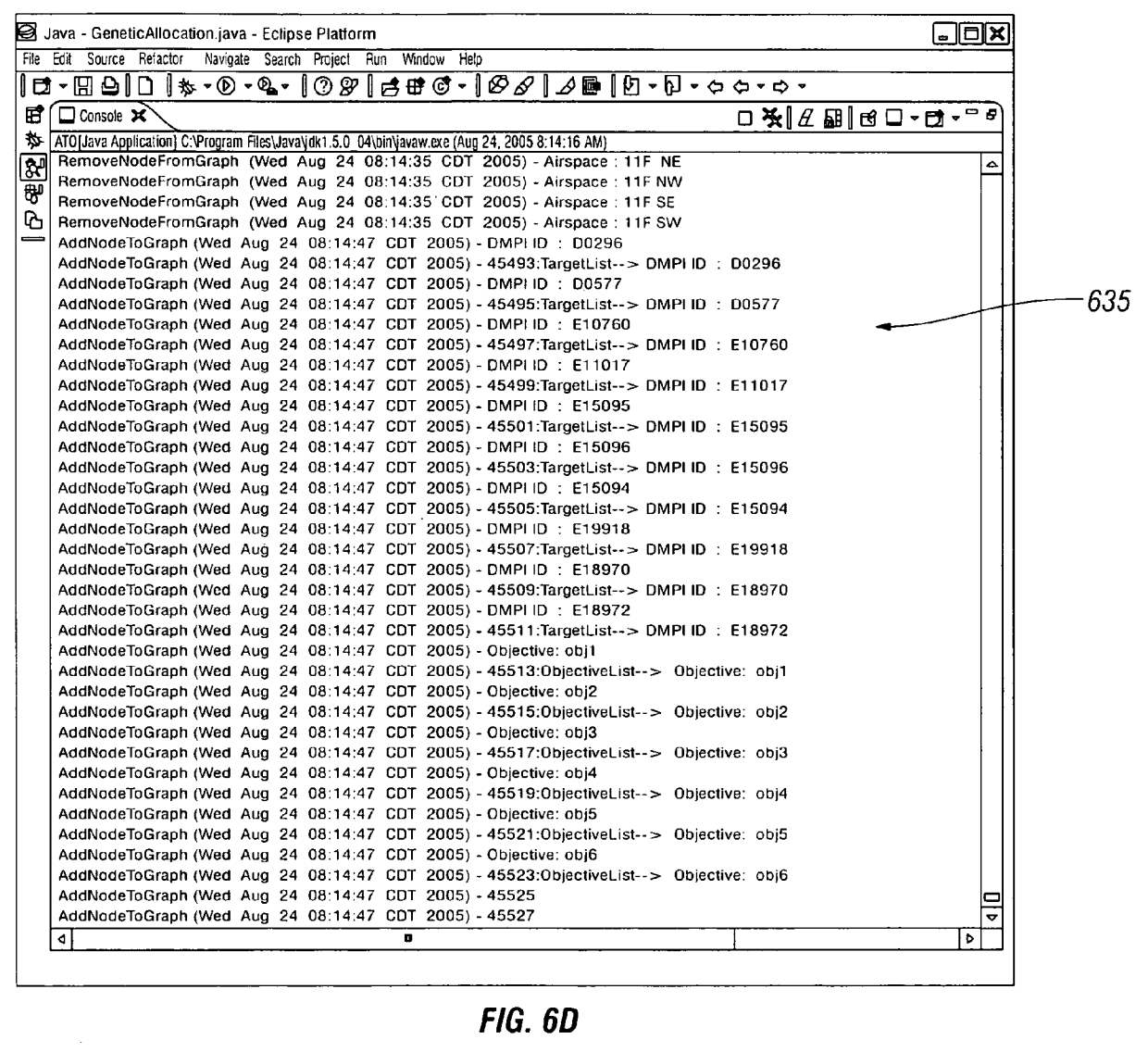

FIG. 6C shows how an objective can be incorporated into the constraint graph when it is accepted. Icon obj1 631 in tree display 630 no longer shows target assignments because the objective has been finalized and the assigned targets in the objective no longer need to be planned. The missions that satisfy the objective have also been added to the constraint graph, and are linked to that objective. At this point all of the objectives have been finalized and are represented in the constraint graph by pre-planned missions and packages. In tree display 630 in FIG. 6C, all of the missions are displayed and are linked to their objectives. Console view 625 tracks the changes for the planner.

Figure 6E:
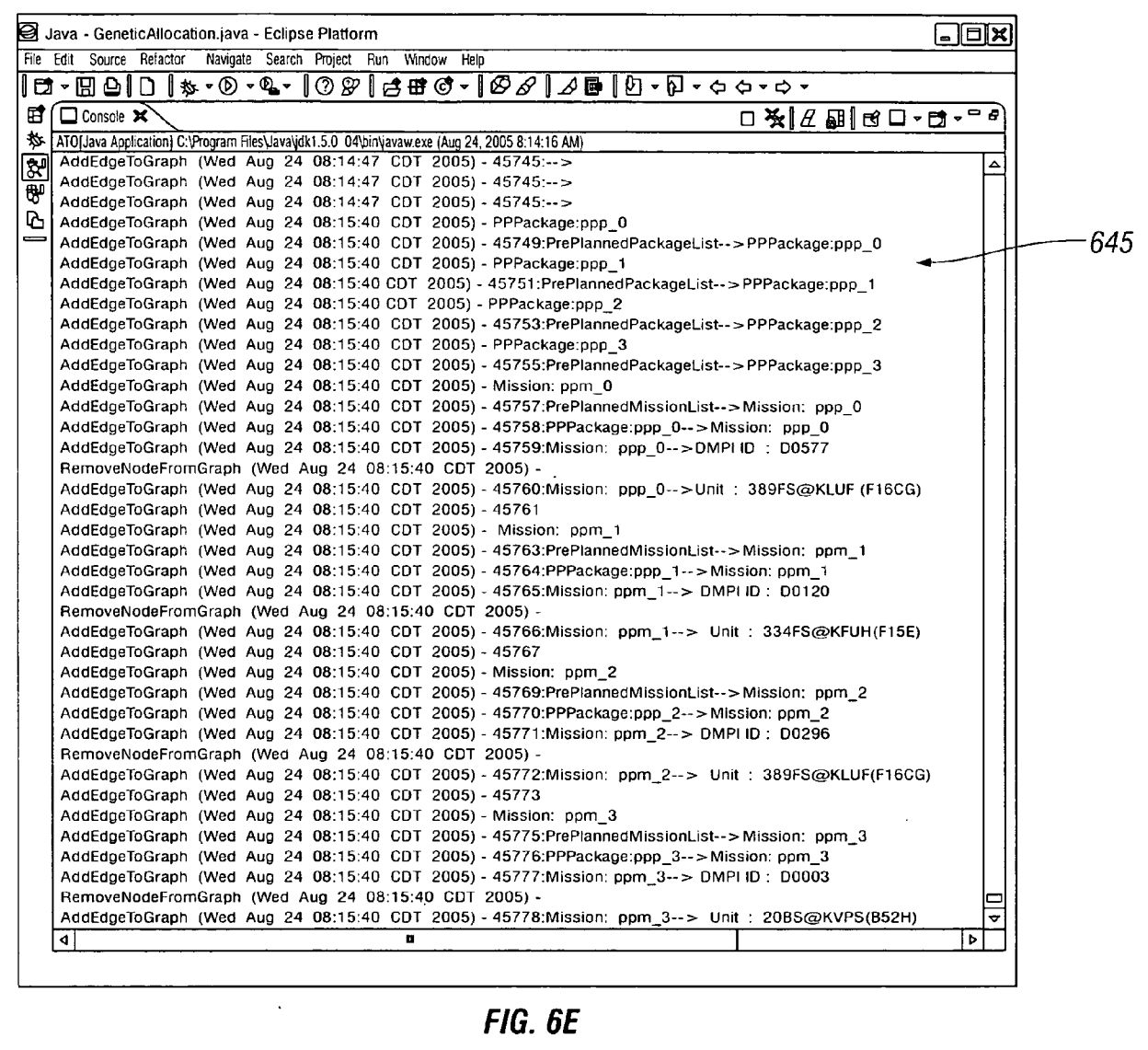

All changes to the constraint graph are tracked so that the planner can revert the constraint graph to any previous state. Console view 635 in FIG. 6D tracks the addition of new targets and objectives, and console view 645 in FIG. 6E shows how missions and packages were added as part of finalizing an objective.

Steps 410, 415, 420, and 425 in FIG. 4 are performed, in an embodiment, by Genetic Algorithm module 220 shown in FIG. 2, steps 455, 460, and 465 are performed by User Interface 240, and steps 430, 435, and 440 are performed by Graph Updater 250. Those of skill in the art will appreciate that the functions, organization and structure shown in FIGS. 2 and 4 depict an exemplary embodiment and can be varied or modified without changing the essential nature of the inventions.

The ability to modify elements of the constraint graph or other constraints between generations of the genetic algorithm enables real-time incorporation of changes in dynamic constraints during the genetic algorithm. "Real-time" in this context means that if the planner accepts an element or submits a modification to the constraint graph during generation j of the genetic algorithm, the constraint graph will be updated before generation j+1 (the next iteration of the genetic algorithm), and each solution candidate produced in generation j+1 will correspond to a connected subgraph of the constraint graph as modified.

Fitness Function

The fitness function component of the genetic algorithm preferably allows the planner to prioritize objectives and then rank solutions accordingly. In an embodiment, objectives are classed as A, B or C, with A objectives having the highest priority, and each objective having associated targets. Thus, an A target would be a target included in objective A. One possible fitness function would score each solution according to the value of each of the following criteria and the following priority ranking.

Maximum Number of A targets in solution;
Maximum Number of best PD (probability of destruction) for A targets used
Maximum Number of B targets in solution;
Maximum Number of best PD for B targets used
Maximum Number of C targets in solution;
Maximum Number of best PD for C targets used
Maximum number of bomber targets
Minimum number of bombers
Minimum number of Fighters
Maximum number of packaged targets
Minimum number of packages
Minimum total distance
Minimum difference in base loading For example, if solutions X and Y score equally on the A target criteria, but solution X has 5 B targets in solution but solution Y has only 4 B targets, solution X would be scored higher than solution Y. Another possible fitness function in an alternative embodiment would score each solution according to the value of each of the criteria and the following priority ranking:

Maximum number of targets within the specified planning time
Maximum number of objectives
Maximum number of hit priority A targets
Maximum average utilization of any bombers
Maximum numbers of packaged targets
Maximum number of packages with more than 4 missions in them
Minimum amount of fuel required for refueling at tankers
Minimum average distance (base to targets to base) required of a mission
Maximum average log (probability of damage)

In an embodiment the score of each chromosome under the fitness function is stored in a solution object that accompanies the chromosome and is used to rank the different chromosomes in the population.

Those of skill in the art will readily recognize that many different fitness functions could be used, including fitness functions using different priority rankings, different scoring criteria, or even a different methodology altogether. Like the selection component of the genetic algorithm, the fitness function component of the genetic algorithm is "pluggable."

Genetic Operators

Several chromosomes, preferably 10-20, are mutated, modified by one or more genetic operators, every generation. In an embodiment, the top 20% of the solution candidates (according the fitness function and the current selection criteria) survive unchanged and are also used for breeding by mutation; and the next 30% are used for breeding, and will survive if they score better than their children (mutations). In an embodiment that integrates aspects of simulated annealing, some mutations (children) are discarded if they score lower on the fitness function than their parent chromosomes and other mutations may survive even with lower scores than their parents. Preferably the criteria regarding which chromosomes will survive, which will die, and which will mutate are stochastic. In an alternative embodiment, for each chromosome that survives, a stochastic process determines whether the chromosome survives unchanged or is subject to mutation. The genetic operator that is applied to a chromosome is preferably chosen stochastically using a weighted roulette algorithm. The genetic algorithm component that determines which chromosomes survive, die off, or mutate, and how the surviving chromosomes are mutated, is pluggable.

The genetic operators respect the connectivity of constraint graph 100. A genetic operator preferably traverses constraint graph 100 to ensure that the modifications to the graph are not infeasible with respect to the constraints encoded in the constraint graph. Other constraints are enforced during scoring under the fitness function, as discussed in more detail below.

Some genetic operators preferably are intelligent in the sense that they make sure that the mutations they cause are beneficial. For an illustrative example, mission and package constraints dictate that certain properties must be maintained by all members of these groups (such as the degree of required SCL similarity, the geographic spread of originating bases or acceptable range of TOT windows). An intelligent genetic operator preferably will check that any changes it makes will conform to these rules. Thus, an intelligent genetic operator that makes a change in one target gene preferably is also able to find all other target genes in the chromosome that are part of the same mission and package and verify that any changes made to the one target do not violate the known package and mission constraints for the missions and package containing the target. In an embodiment this process is facilitated by a data structure (preferably a tree) created during scoring that identifies all packages associated with a chromosome, each mission within the package, and each DMPI associated with each mission, so that genetic operators can quickly mutate chromosomes by exchanging or transferring missions and targets from existing allocations.

Following is a brief description of some exemplary genetic operators used by an embodiment.

The MergePackages mutation operator takes two packages and combines them. This is accomplished by moving all of the missions from one package to another. If one package includes a target with a pre-assigned TOT then that package is preserved. If both packages have pre-assigned TOT then the operator performs no operation. The operator validates that the merging makes sense from the standpoint that the distances between all targets are valid and that the mix of aircraft is sensible. This operator will not add missions to pre-assigned packages.

The MergeMissions mutation operator takes two missions and combines them. This is accomplished by moving all of the targets from one mission to another. If one mission includes a target with a pre-assigned TOT then that mission is preserved. All targets will be hit using the same SCL. The operator first validates that the merging makes sense from the standpoint that a common SCL can in fact be used against the targets. This will not add targets to pre-assigned missions.

The CreateStandoffMission mutation operator creates a mission for missiles, which in an embodiment are treated as both aircraft and munitions.

The CreateStandoffMissionForEmptyPreplannedPackage mutation operator creates a mission for missiles for packages that only have a TOT but no resources or DMPIs.

The CreateStandoffMissionForPreplannedPackageContainingDMPIs mutation operator creates a mission for missiles for packages that only have a TOT and DMPIs but no pre-assigned resources.

The CreateGreedyFighterMissionPackage operator creates a fighter mission using un-assigned DMPIs at the stage of the computation that the operator is called. As a result it merely attempts to get the remaining unassigned DMPI's.

The CreateFighterMissionForEmptyPackage operator creates a fighter mission for pre-assigned packages with TOT but no DMPIs or pre-assigned resources.

The CreateFighterMission operator creates a non-stealth fighter mission using assigned or unassigned resources but not pre-assigned resources. This may steal DMPI's from other assigned missions. As with all of the fighter missions this will assign any fighter from the F-18 to an A-10.

The CreateFighterMissionForUserDefinedPackage mutation operator creates a Fighter Mission for existing packages that have no resources applied to them but includes a set of targets and a TOT.

The CreateFighterMissionForPreplannedPackage mutation operator creates a Fighter Mission for packages that includes a set of targets, fighter resources and a TOT. This essentially is a smaller version of the larger problem where the planner has specified which resources are available for a set of targets.

The CreateBomberMission operator creates a Bomber mission from unassigned or assigned but not preplanned resources. Attempts are made to fill the bomber with additional targets in the appropriate range.

The CreateBomberMissionForEmptyPreplannedPackage mutation operators creates a Bomber mission for packages that have no resources applied to them and no targets as well. Only a TOT is specified.

The CreateBomberMissionForUserDefinedPackage mutation operator creates a Bomber Mission for packages that have no resources applied to them but includes a set of targets and a TOT.

The CreateBomberMissionForPreplannedPackage operator creates a Bomber Mission for packages that includes a set of targets, fighter resources and a TOT. This essentially is a creating bomber mission with a restricted set of targets and resources.

The AddTargetsToExistingFighterMission mutation operator attempts to better utilize a fighter's munition carrying capacity by looking for additional targets that can be struck using with "leftover" munitions in an existing fighter mission.

Some constraints, in an embodiment, are not encoded in the constraint graph but are embodied and enforced by the genetic operators. For an illustrative example, it is a planning constraint that each mission has one and only one SCL associated with the mission, and the MergeMissions genetic operator will fail if it cannot merge two missions that have the same SCL.

Those of ordinary skill in the art will recognize that the foregoing list of genetic operators is exemplary only and that many other or different genetic operators can be used for solving the exemplary problem of scheduling air missions or completely different problems without changing the essential nature of the invention.

Steps of Exemplary Genetic Operator

Figure 7:
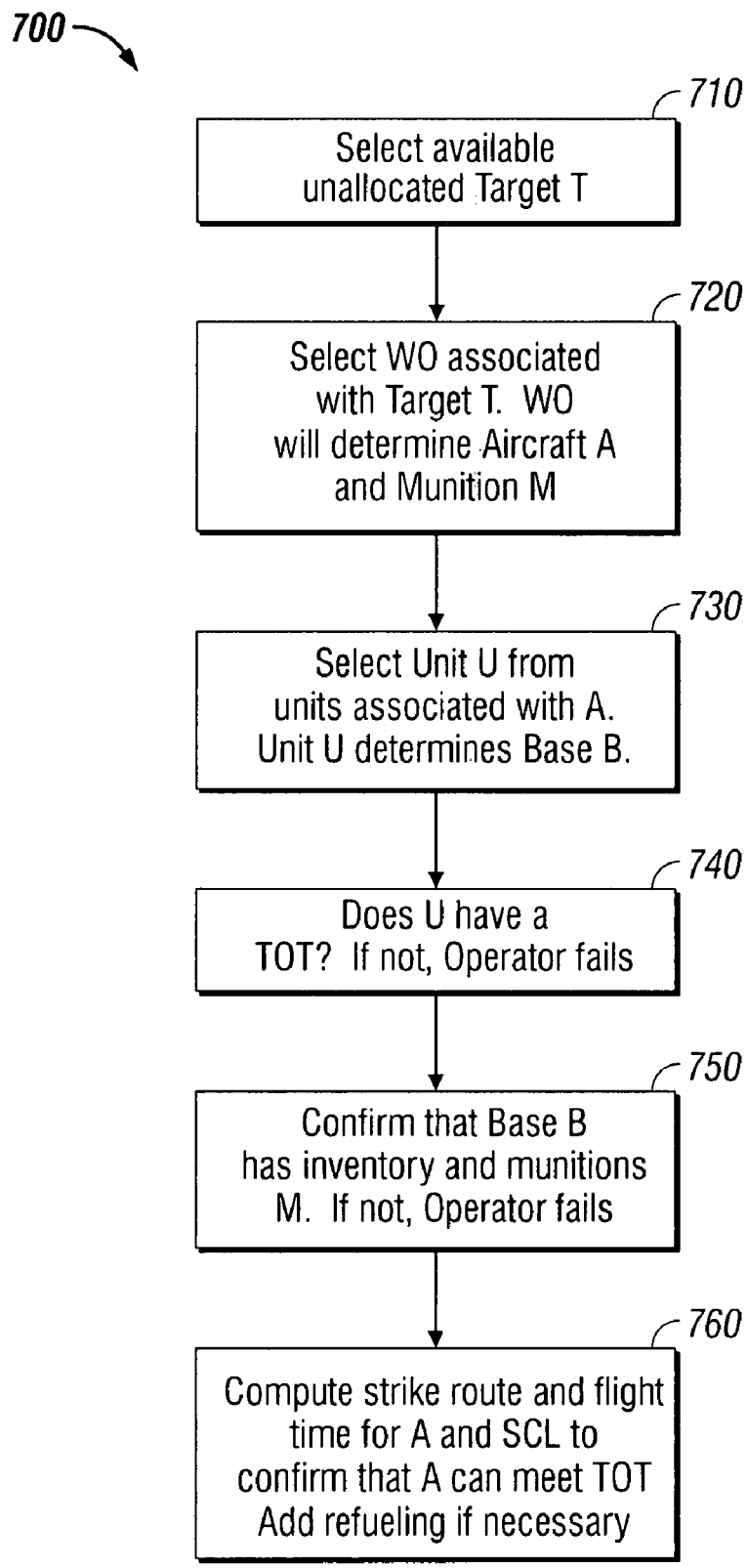
FIG. 7 illustrates the steps of an exemplary genetic operator.

FIG. 7 depicts the steps of an exemplary genetic operator 700 ("CreateFighterMission") used to create a new fighter mission. Although this algorithm enters the constraint graph at the target assignment node, those of ordinary skill in the art will appreciate that other genetic operators could begin with other nodes, e.g., a unit association node.

In Step 710 an target T is chosen from the list of target assignments that have not been previously-allocated to a mission. If there are no available unallocated missions the genetic operator fails. Preferably the target is selected at random but alternative selection methods may be used.

In step 720 a weaponeering option WO is chosen from the list of weaponeering options associated with target T via edges in the constraint graph. Preferably WO is selected at random from the list of weaponeering options but alternative selection methods may be used. WO will designate an aircraft type A and a munitions type M.

In step 730 a unit U to fly A is chosen from the list of units associated with A via edges in the constraint graph. Preferably U is selected at random from the list of units but alternative selection methods may be used. Selection of U also determines (through the unit association relationship) selects the base B at which U is based. If there are no available units that fly A, the genetic operator fails.

In step 740 a time on target TOT for U is chosen from the time objects associated with a unit contract for U via edges in the constraint graph. Preferably TOT is selected at random from the list of TOTs but alternative selection methods may be used. If there are no time objects available for U, the genetic operator fails.

In step 750, the algorithm confirms that base B has the inventory of Munitions M required by WO. The inventory of munitions M at base B is decremented so the munitions will not be reallocated to another mission.

In step 760, a list of all SCLs that include the munitions and aircraft in WO is created and a standard configured load SCL is chosen. Preferably SCL is selected at random from the list if SCLs but alternative selection methods may be used. The number of munitions required divided by the SCL will produce the number of aircraft A required to strike target T.

In step 770 a stick route is computed from base B to T. If there is no stick route that gets A to T at TOT, the genetic operator fails. If the SCL does not permit A to make the round-trip from base B to target T to B without refueling, refueling stops are added to the trip until the mission is flyable. If the mission is not flyable, the genetic operator fails.

In an embodiment, refueling stops are incorporated as waypoints in the flight path. If a target cannot be prosecuted without refueling, the algorithm searches for refueling airspaces that can bring it within range of the target. The initial leg of the mission may have a longer range than subsequent legs since the SCL may have an additional fuel tank which does not get refilled during refueling. Refueling airspaces are chosen for consideration as intermediate stops based on the constraint on their proximity to two waypoints and what the distance between these two stops would be without the refuel stop. Tankers have schedules that must be adhered to in order to ensure that each aircraft will have sufficient time to get the necessary fuel for its mission. In order for a planned mission to be successful, the scheduled arrival of an aircraft to the mission target must be within a margin of an available refueling time. It may be the case that delays or excessive fuel consumption over the target area may require replanning in order to satisfy the needs of the fighter or bomber. If the planner cannot satisfy this plan within the existing constraints, then this refueling task may have priority sufficient to replan existing missions. This is accomplished by first tweaking the times on the schedule to see if missions are still flyable with the new refueling times, if so then the graph is modified to reflect the new times. Tanker missions supply fuel to the fighters and bombers. They also consume their own fuel, so interchanging refueling times are not equivalent. The tanker's mission always has to be rechecked to ensure that it is flyable in the face of any refueling change. Finally it may take a sending a new tanker to an airspace to ensure that mission requirements are met in the face of necessary replans.

Those of ordinary skill in the art will recognize that the particular steps and sequence of the genetic operator depicted in FIG. 7 are exemplary only and that a wide variety of genetic operators, using steps and sequences wholly or partly different from those depicted in FIG. 7, can be used to advantage in the context of a genetic algorithm without changing the nature of the present invention.

Structure of Exemplary Chromosome

Figure 8:
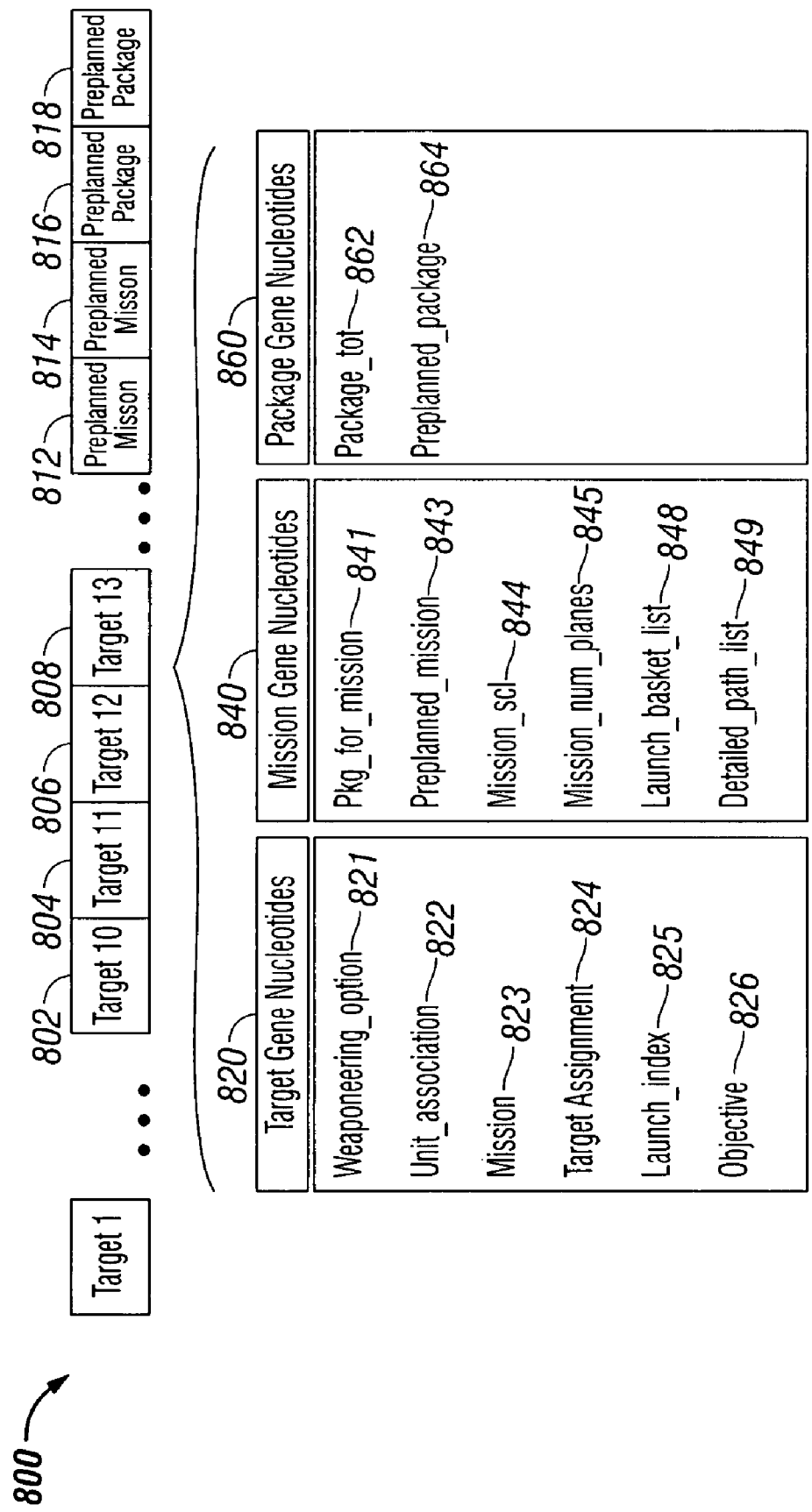
FIG. 8 depicts elements of the structure of an exemplary chromosome.

In an embodiment of the invention each chromosome is represented as a singly-indexed array of java objects called nucleotides. Genes in this embodiment have fixed numbers of these nucleotides, simplifying access to the chromosome on a gene-by-gene basis. FIG. 8 depicts elements of the structure of an exemplary chromosome 800. All targets with a current target assignment (i.e., targets for which the planner intends to generate missions) have a gene in the chromosome. The chromosome will have no genes corresponding to targets if all targets have missions against them for the required number of times, or are unhittable. The chromosome only contains genes for serviceable targets that have a target assignment, but which have not been planned. If a target is serviced, the gene includes objects specifying target attributes (Target Gene Nucleotides 820), mission attributes (Mission Gene Nucleotides 840), and package attributes (Package Gene Nucleotides 860) to describe how the target is serviced. If a target is not serviced in the chromosome, a null value holds the places in the array for each object in the gene.

The number of object types included for each gene is a constant, though some types may have multiple elements such as waypoints for a path. The number of genes during a generation is a constant that is linearly proportional to the number of valid targets, the number of user pre-assigned packages that can accommodate additional missions, and the number of pre-defined missions that can accommodate additional targets, so minor algebra can be used to convert gene indices and object nucleotide indices into an index into the chromosome array.

Considering more targets in the problem increases the size of the chromosome linearly. The ability to add targets in real time addresses the problem of targeting time-critical targets. When the planner becomes aware of a time-critical target, the planner simply adds a target assignment node to the graph (with, optionally, a TOT), and the chromosomes change from generation to generation to accommodate these new targets. In an embodiment the implementation uses the fast System.arraycopy Java command as a native method to enhance the speed of the genetic operators.

Target Gene Nucleotides 820 include the following nucleotides.

Weaponeering Option nucleotide 821 is a pointer to a weaponeering option node in the constraint graph associated with the corresponding target node for this gene. It represents the weaponeering option chosen in this solution.

Unitassociation nucleotide 822 points to a unit association node in the constraint graph and thus identifies the unit, base, and aircraft for this gene.

Mission nucleotide 823 is the index number of the gene that contains information about the mission associated with this target. This information is located in the "Mission section" of the gene. For an illustrative example, Mission Gene Nucleotides 840 for target #12 (806) might specify the details of a particular mission. If target #11 is part of the same mission, then Mission nucleotide 823 in gene 804 would contain an integer corresponding to the index number of the mission gene for target #12 (gene 806) to identify the mission information for the target 11. As a mission may include multiple targets, mission nucleotides 823 in multiple genes may all include the same value to specify that they are part of the same unique mission. There can never be more strike missions than targets and in a solution many genes have unused mission data. This value is assigned during the genetic process in contrast to the pre-assigned mission described below. Preferably there is no pointer to a mission that cannot take any more targets.

Targetassignment nucleotide 824 is a pointer to a target assignment node in the constraint graph. Information specific to the target preferably is accessible from the target assignment node and its relationship with other nodes such as weaponeering options can be checked when the chromosome is scored.

Launch_index nucleotide 825 contains an index into the launch basket list in the mission gene for the mission associated with this target.

Objective nucleotide 826 points to the objective node in the constraint graph associated with this target assignment.

Mission Gene Nucleotides 840 include the following nucleotides:

Pkg_for_mission nucleotide 841 contains the index number for the gene that contains information about the package associated with this mission. This information is located in the "Package section" of the gene. For an illustrative example, Package Gene Nucleotides 860 for target #12 (806) might specify the details of a particular package. If the mission that strikes target #13 is part of the same package, then Mission nucleotide 823 in gene 808 (for target #13) would contain an integer corresponding to the gene for target #12 (gene 806) to identify the package information for the target #13. As a package may include multiple missions, Pkg_for_mission nucleotide 841 in multiple genes may all include the same value to specify that they are part of the same unique package. There can never be more packages than targets nor missions and in a solution many genes have unused package data. This value is assigned during the genetic process in contrast to the pre-assigned package for mission described below. Preferably there is no pointer to any package that cannot take more missions.

Planned_mission nucleotide 843 points to a pre-planned mission node in the constraint graph. Preferably it only points to missions that can take more targets.

Mission_scl nucleotide 844 points to the SCL node in the constraint graph that is valid for all planes in the mission. Some genetic operators have to compute the SCL in order to do their job. Otherwise this is computed in the scoring and is entered into the chromosome during scoring. All targets in this mission are serviced by planes carrying this SCL.

Mission_num_planes nucleotide 845 is an Integer representing the number of planes in this mission. Typically this is computed in scoring but genetic operators may compute this number and save it as well.

Launch_basket_list nucleotide 848 points to a list of launch basket objects identifying waypoints where certain munitions must be launched.

Detailed_path_list nucleotide 849 points to the a list containing complete information for the mission route, including preferably launch baskets and refueling locations.

Package Gene Nucleotides 860 include the following nucleotides.

Package_tot nucleotide 862 points to the time object in the constraint graph associated with the TOT for this package. The TOT may be part of the feasible set of times provided in the constraint graph or it may be a pre-assigned TOT.

Planned_package nucleotide 864 points to a pre-planned package node in the constraint graph. Preferably it only points to packages that can take more missions.

The chromosome 800 includes gene components 812 and 814 representing genes for preplanned missions that can accommodate more targets. Preferably the structure is the same as for other genes, except that the target gene nucleotides contain null values.

The chromosome 800 includes gene components 816 and 818 representing genes for preplanned packages that can accommodate more missions. Preferably the structure is the same as for other genes, except that the target and mission gene nucleotides contain null values.

Generating a score for the fitness function with this chromosome configuration is a two-step process. Because much of the information in the chromosome is stored as pointers to the constraint graph or to other points in the chromosome, it is first necessary to create a graph (preferably a tree) rooted at each package associated with the chromosome, with pointers to each mission associated with the package, and with pointers from each mission to the targets associated with the mission. The next step is to iterate through the packages (and trees rooted at each package) and score each package.

Additional Constraints

In an embodiment there may be certain constraints on solutions that are enforced during the scoring process regardless of changes in the dynamic constraints encoded in the constraint graph. Some of these constraints may be pluggable for national security, speed or flexibility purposes. Following is a non-exhaustive list of exemplary constraints enforced during the scoring process in an embodiment:

Exemplary constraints enforced during scoring for a popup target mission include: If servicing a popup via a ground alert, then the same constraints as a strike target are used. If servicing a popup via an airborne alert, then paths are planned from the airspace where the airborne alert is stationed and existing fuel consumption must be considered in the plan, e.g., the plan may need to refuel before executing its new mission.

Exemplary constraints on the planning of a single strike target include the following: a mission; a weaponeering option; a legal and viable combination of unit, aircraft and base (a Unit Association) where the aircraft in the unit match (or can substitute for) the aircraft in the weaponeering option, the TOT falls with the unit contract for the selected unit for a target with a strict TOT, and there is a TOT within a unit contract for the selected unit for all other targets; and an SCL that has the selected munition and aircraft, where the munition matches the munition in the weaponeering option, the aircraft matches (or can substitute for) the aircraft in the weaponeering option and the SCL matches the aircraft in the unit association; and there must be sufficient inventory of the munition in the weaponeering option in the selected base in the unit association.

Exemplary constraints enforced during scoring for a unit include: the unit must have at least one unit contracts specifying how many sorties are available during what time interval; the unit must have inventories of aircraft; the unit cannot fly more aircraft than its inventory; units must have sortie limits and a unit cannot fly more sorties than its sortie limits.

Exemplary constraints on an airspace include the following: targets in no-hit zones cannot be hit; targets cannot be hit with aircraft listed in the aircraft restricted zone; targets cannot be hit by aircraft of a given service in a service restricted zone; targets cannot be hit by listed munitions in a weapon restricted zone.

Exemplary constraints on an airborne alert mission include the following: the SCL aircraft type must match the unit aircraft; some aircraft must fly solo and there cannot be a mission that uses more than one of these aircraft; the mission flight path for missions without refueling must be shorter than the SCL range with external tanks or, if there are no tanks, the same as the SCL range without external tanks; If the flight path exceeds the range with external tanks, the flight path must include refueling stops, and each subsequent path between refuelings must be less than the range without tanks; the total fuel used must not exceed the total available; and a mission's launch basket locations must correspond to waypoints along the mission's path.

Exemplary constraints on a tanker mission include the following: the tanker consumes the same fuel it provides for its clients; the burn rate of a tanker times the flight time, minus the offloads of the clients must be positive; a tanker must have slots or times available to offload fuel; strike aircraft that refuel must have a valid slot of duration long enough to offload fuel; offload must use correct boom type; an airspace may have more than one tanker, although preferably the number of tankers in a single airspace is limited to 3.

Exemplary constraints on a strike mission include the following constraints: it must have one or more targets; each target shares the same unit association, where there is only one type of aircraft and all aircraft in the mission come from the same unit, the aircraft in the mission match (or can substitute for) the aircraft in the SCL and weaponeering option, the SCL and weaponeering option otherwise match; the SCL aircraft type must match the unit aircraft; the mission SCL must carry the right types of munitions and sufficient numbers to strike all of the targets as weaponeered; the sum of each type of munitions weaponeered to hit the targets must be less than or equal to the munitions in the SCL times the number of aircraft; there cannot be a mission that uses more than one of the aircraft that fly solo; a mission's standoff strikes must be grouped into launch baskets with user-configurable parameters; missiles are limited to 85% of flyout range; all targets must be within range of the munition, and preferably all targets in a mission's launch basket are within the minimum standoff range of the collection of munitions applied to the target; all the targets must be grouped within a launch basket hemisphere, i.e., the angle made between the targets and the launch basket (with the launch basket as the vertex) does not exceed 180 degrees; the mission flight path for missions without refueling must be shorter than the SCL range with external tanks or, if there are no tanks, the same as the SCL range without external tanks; If the flight path exceeds the range with external tanks, the flight path must include refueling stops, and each subsequent path between refuelings must be less than the range without tanks; the fuel consumed must be sufficient to keep the plane in the air till the next time it is refueled; the total fuel required must not exceed the total fuel available; and a mission's launch basket locations must correspond to waypoints along the mission's path.

Exemplary constraints on a package include the following: a package must contain two or more missions (a package with only one mission preferably is identified as a mission without a package when displayed to the planner); missles are not grouped into packages; all members of a salvo (i.e., a collection of missiles that are launched simultaneously) are launched from the same location; missions using aircraft that must fly solo cannot be part of a multiple mission package.

Exemplary constraints on aircraft include the following: fighters always fly in multiples of N where N is a user-configurable even number; bombers can fly solo or the planner can configure a minimum number of bombers in a mission; aircraft cannot fly longer than the fuel capacity/burn rate or its combat radius if the fuel capacity/burn rate cannot be computed.

Exemplary user-configurable constraints include the following: strike flow may be continuous or broken into non-overlapping attack waves; packages may not violate user configurable package makeup restrictions (e.g., 'Joint Packaging' makeup may be made up of units from any service, 'Same Unit' packaging makeup must have all missions sourced from the same unit, 'Homogeneous' packaging makeup must have all missions sourced with the same aircraft type, 'Service Type' packaging makeup must have mission units from the same service, and 'Country' packaging makeup must have mission units with the same country codes); different refueling modes include 'No Tanking,' which does not allow for any refueling, 'Infinite Tanking,' which assumes an infinite supply of fuel, and 'Use Available Tanking,' which is limited to the amount of fuel specified; if the threat severity at a target location exceeds the 'Use Low Observable or Standoff' threshold, targets must be prosecuted using stealth aircraft and/or standoff munitions; if the threat severity at a target exceeds the 'Use Suppression' threshold, SEAD (Suppression of Enemy Air Defenses) measure must be employed for the target; a strike mission cannot strike more than the user-specified number of targets; the number of aircraft in a package may not exceed the user-configurable maximum; whether the planner may add missions to user generated packages; whether the planner may add targets to user generated missions; whether the planner may add aircraft to user generated packages; whether the planner may create new packages, or instead only work with existing packages; minimum required PD and a maximum PD; substitute aircraft for some munitions; whether the planner can assume infinite base munition inventory; mission diameters (which constrain drop target locations and launch basket locations for a mission) for bombers and fighters; total package diameter for all fire locations; distance and time separation parameters for missions not in the same package; maximum number of targets that may be in a mission; for "existing" missions and packages, whether the planner may add targets to existing missions, targets to existing packages, additional aircraft to an existing package, or missions to existing packages, and whether the number of targets in a mission is limited to the targets that can be hit by the aircraft currently specified in the package.

The scoring process in an embodiment may attempt to mutate defective chromosomes. If a chromosome is found defective because, e.g., it violates one or more constraints, preferably it is projected to the nearest "viable" chromosome. For an illustrative example, if a package exceeds a user-specified constraint on the number of missions, a genetic operator will be applied that will delete missions from the package until the number of missions complies with the user-specified constraint.

Node Irrelevance

In some cases, e.g., when the constraint graph is large, it could be advantageous to reduce the size of the potential solution space by preventing consideration of solution elements that cannot contribute to a potential solution. Reducing the solution space causes faster convergence of the genetic algorithm. Further, providing information about irrelevant nodes could be important to the planner. For an illustrative example, targets that are irrelevant will not be included in any solution candidate, and it may be important to the planner to identify the targets that will not be struck under the current set of constraints. Consequently an embodiment preferably includes a method and system of identifying, handling, and reporting irrelevant nodes. A node in the graph is deemed relevant if a computation requires the node. If a computation does not require the node, the node is marked irrelevant. For example, a weaponeering option node that contains a munition that is not contained in any SCL is irrelevant. Although it would be possible to remove an irrelevant node from the graph, that solution is less desirable because the node may become relevant after the passage of time or other developments.

The irrelevance status is used by the genetic operators. Many genetic operators will attempt to mutate (or cross-over) a chromosome by adding or substituting a neighbor (on the graph) of an element already in the chromosome, and requesting the neighbor of a node will not return irrelevant nodes. For example, a target may have 4 weaponeering options with one irrelevant. If during the operation of a genetic operator a targets node is queried for its weaponeering options, only the three relevant ones will be returned. Irrelevant nodes will continue to be displayed with the graph. In an embodiment the GUI highlights irrelevant nodes in a different color, preferably red.

Figure 9:
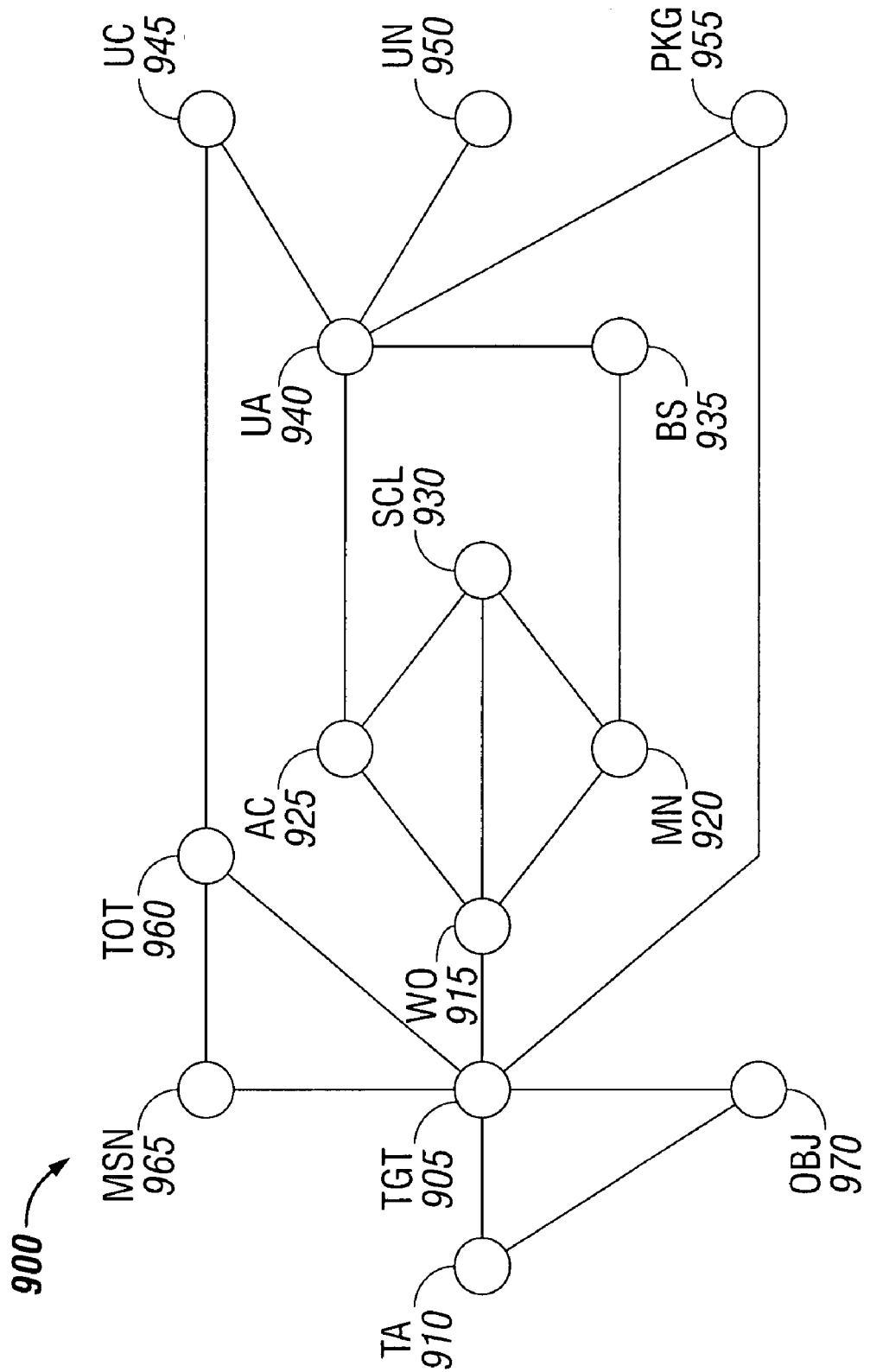
FIG. 9 depicts an exemplary relevance-neighbor graph.

FIG. 9 depicts an exemplary relevance-neighbor graph 900, and shows the neighbor nodes for each node type in the relevance analysis. The node types shown in relevance-neighbor graph 900 are targets 905, target assignment 910, objective 970, weaponeering option 915, mission 920, aircraft 925, SCL 930, base 935, unit assignment 940, unit 950, unit contract 945, package 955, TOT 960, and mission 965. The edges in relevance-neighbor graph depict neighbor relationships, so that instances of node type SCL 930 are neighbors of instances of node types aircraft 925, weaponeering option 915, and mission 920.

Figure 10:
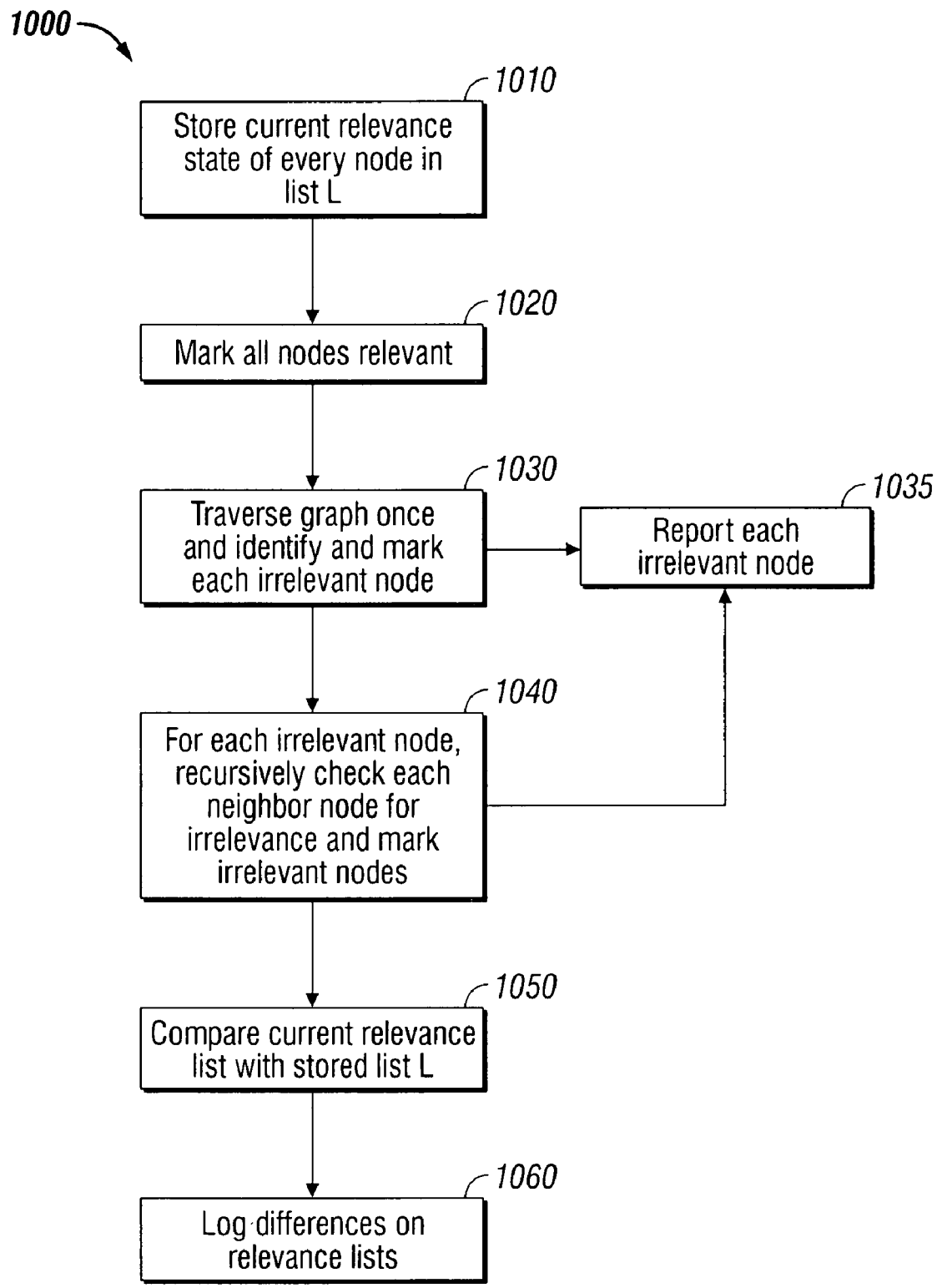
FIG. 10 depicts the steps of an exemplary method for identifying irrelevant nodes.

FIG. 10 depicts the steps of an exemplary method for identifying irrelevant nodes. In step 1010 the current state of relevance of all nodes in the graph is stored in a list L. In step 1020 all nodes are marked as relevant. In step 1030 the graph is traversed once and each node is examined for relevance based on the relevance criteria for that class of node and the status of its neighbors. If a node fails its test for relevance then in step 1035 that fact will be logged and, preferably, reported to the planner along with the reason why the node is irrelevant. Setting a node to be irrelevant indicates that the neighbors of this node needs to be considered as well. The neighbors may no longer be relevant in light of the irrelevance of the current node. In step 1040 the graph is recursively re-traversed by examining the relevance status of each neighbor node of an irrelevant node. This process repeats until no further nodes can be marked irrelevant. Irrelevant nodes will be logged and, preferably, reported to the planner. In step 1050 the final state of relevance is compared to the initial state of relevance saved in list L and the differences are logged. In an implementation the relevance relationship between neighbors is computed once and cached. Later calls for a neighbor (by, e.g., a genetic operator) do not result in re-computation of the neighbors. Irrelevance is re-computed whenever the graph changes, and the caches are refreshed then as well.

The data structures associated with the relevance analysis preferably are stored on a hard disk or other media in the same manner as constraint graph 210 and population of solutions 230 in FIG. 2. The processes are handled by processors and RAM similarly to processes genetic algorithm 220, graph updater 250, and user interface 240 in FIG. 2.

The following describe exemplary rules for determining whether a particular instance of a node type is irrelevant in an embodiment:

Weaponeering Option nodes are irrelevant if here are no aircraft that support them, if there are no munitions that support them, if there are no SCLs that marry the plane and munition, or if there are no munitions that support them.

SCL nodes are irrelevant if there are no aircraft that support them, if there are no munitions that support them, if there are no weaponeering options that use them, if there are no aircraft that support them, or if there are no munitions that support them.

Aircraft nodes are irrelevant if there are no SCLs that support them, if there are no weaponeering options that use them, or if there are no SCLs that support them.

Munition nodes are irrelevant if there are no SCLs that use them, there are no weaponeering options that use them, or if there is no base with an inventory of them.

Base nodes are irrelevant if there are no munitions at the base, or there are no units associated with the base.

UnitAssociation nodes are irrelevant if there are no relevant bases, there are no relevant units, there are no relevant aircraft, or there are no relevant unit contracts. Unit nodes are irrelevant if there are no relevant unit association node neighbors. UnitContract nodes are irrelevant if there are no relevant unit association neighbors.

TOT nodes are irrelevant if the TOT has expired and any associated Mission is irrelevant AND any associated Unit contract has expired.

Mission nodes are irrelevant if all associated time objects (in particular the landing time of the mission) have expired and it is not part of a package. In addition a mission node is irrelevant if it is part of an expired package.

TargetAssignment nodes are irrelevant if the target is irrelevant, if resources (unit associations) associated with a relevant package are not consistent with the weaponeering of the associated target, or any associated package is not relevant.

Target nodes are irrelevant if they are not part of a mission and it has no relevant weaponeering options or no relevant target assignment node or an expired TOT. Target nodes also are irrelevant if they are part of an irrelevant mission and it has no relevant weaponeering options or no relevant target assignment node or an expired TOT.

Package nodes are irrelevant if they have expired, they have no relevant targets, they have no relevant missions, they have an irrelevant unit association (resource), or they have unit associations irrelevant for the provided targets.

Management of Time Objects and Streaming

In an embodiment, the constraint graph and elements in the constraint graph are time-sensitive and the representation of each element in the constraint graph will include information such as start time (the time the element enters the constraint graph), end time (the time when planning was completed), scheduled plan time (the time deadline for providing a solution to the plan), expiration time (the time when element will be removed from the graph), and hold time (the time before the element expires when plans involving the element will not be altered). For example, planned missions and packages with an associated TOT will be automatically removed from constraint graph 100 after the TOT has passed. Objectives preferably will have associated planning deadlines, so that objectives with earlier deadlines are given priority and planned earlier. For another example, a particular unit may have a unit contract that allows it to begin flying sorties after a particular time T, so that constraint graph at time T+1 would automatically show the unit contract as an available resource, whereas the constraint graph at time T−1 would not show the unit contract as an available resource. Once an objective deadline has passed, the assigned solution for that objective is accepted and becomes a fixed constraint in the constraint graph 100 that all subsequent planning mist work around. Planning deadlines can be implemented preferably by creating a condition that suspends iteration of the genetic algorithm after a predetermined period of time.

To accommodate changes in dynamic constraints a fundamental consideration is memory management. Constraint graph data must be retired to avoid overwhelming the memory and processing capability of the system. In an embodiment the planning window refers to the time frame, typically 24 hours, of the planning process. Advancing the leading edge of the planning window is accomplished by adding additional time nodes. For example a 5 minute time node can be added every five minutes or 12 time nodes can be added every hour. The trailing edge of the planning window presents other difficulties, however. Time objects are associated with packages and TOTs. The package contains one or more missions, and the planner can even generate packages with no missions. These packages have start and end times. Upon the expiration of an end time of a package all of the nodes associated with each mission in the package can be removed. The targets can be removed or kept as needed but the packages and missions are removed, and the unit contracts are removed if they only reference expired objects. For example an extended bomber mission will keep nodes in the graph that extends into the past until the mission has ended. As long as a time node references a package that has not ended then the time will stay as well as anything that is needed to understand the package. Targets are removed when the associated mission is removed unless it has already been added to the target assignment node list to be hit again in a future mission. Even targets that have not been planned against will be removed if there are hard TOTs associated with them that have expired. The TOTs in the graph are removed when they have expired and the only references associated with the time object are those required to place it in the graph. The time objects are then removed from the graph as well. Thus expired data is removed automatically from the graph when current and future events do not refer to it. These objects affect the layout and size of the chromosome. Thus long lasting objects will keep the chromosome long as well. When these things are finally released from the graph, the size of the chromosome will drop accordingly. Memory is reclaimed when objects are removed from the chromosome and the graph.

Those of skill will recognize that the techniques of the embodiments described herein may be implemented to advantage in a variety of sequential orders and that the present invention may be generally implemented in magnetic media such as disks, tapes, CD-ROMs, web servers, remote servers, or other storage media for introduction into a system for solving a optimizing solutions to a problem with dynamic constraints. In such cases, instructions for executing the steps described herein will be embedded in the media.

Further, those of skill in the art will recognize that although embodiments relating to creation of an Air Tasking Order are described herein, the principles described herein may be applied more generally to other types of optimization problems involving dynamic constraints.

Although many embodiments have been described in detail, it will be apparent to those skilled in the art that many embodiments taking a variety of specific forms and reflecting changes, substitutions and alterations can be made. The described embodiments illustrate the scope of the claims but do not restrict the scope of the claims.

The invention claimed is:

1. A method of solving an optimization problem comprising a plurality of dynamic constraints, the method being implemented by a computer including at least one processor and comprising the steps of:

creating, using the at least one processor, a constraint graph corresponding to the plurality of dynamic constraints of the optimization problem, wherein the constraint graph includes a node set and an edge set, wherein the constraint graph includes one or more subgraphs whose node set and edge set are subsets of the node set and the edge set of the constraint graph, and wherein potential feasible solutions correspond to one or more connected subgraphs;

generating, using the at least one processor, a plurality of solutions to the optimization problem using a genetic algorithm having a plurality of iterations;

modifying the constraint graph by changing one of the plurality of dynamic constraints, wherein the step of modifying the constraint graph occurs only between iterations of the genetic algorithm; and after modifying the constraint graph, discarding, using the at least one processor, each one of the plurality of solutions that does not correspond to a connected subgraph of the modified constraint graph.

2. The method of claim 1 in which the optimization problem comprises scheduling a plurality of air missions.

3. The method of claim 1 in which the constraint graph is modified by converting an element of one of the plurality of solutions into an additional constraint in the constraint graph.

4. The method of claim 1, wherein the node set of the constraint graph includes nodes that represent variables and the edge set of the constraint graph includes edges that represent the plurality of dynamic constraints on or between the variables.

5. The method of claim 1, wherein the modifying the constraint graph includes enabling a human planner to review and change in real time one of the plurality of dynamic constraints using one or more user interfaces.

6. The method of claim 1, wherein the modifying the constraint graph includes automatically changing one of the plurality of dynamic constraints based on time constraints.

7. The method of claim 1, wherein the modifying the constraint graph includes enabling a human planner to revert the constraint graph to any previous state.

8. The method of claim 1, wherein the modifying the constraint graph step includes changing one of the plurality of dynamic constraints based on a trigger event, and wherein the trigger event is one or more of a change in objectives, a change in resources, discovery of new targets, a change in an airspace status, and discovery of a new threat.

9. The method of claim 1, wherein one or more of the plurality of the dynamic constraints are time-sensitive and include one or more of a start time, an end time, an expiration time, and a hold time.

10. A method of scheduling a plurality of air missions, the method being implemented by a computer including at least one processor and comprising the steps of:

creating, using the at least one processor, a constraint graph corresponding to a plurality of air mission constraints, wherein the constraint graph includes a node set and an edge set, wherein the constraint graph includes one or more subgraphs whose node set and edge set are subsets of the node set and the edge set of the constraint graph, and wherein potential feasible solutions correspond to one or more connected subgraphs;

generating, using the at least one processor, a plurality of proposed air missions using a genetic algorithm having a plurality of iterations;

modifying the constraint graph by changing one of the plurality of dynamic constraints, wherein the step of modifying the constraint graph occurs only between iterations of the genetic algorithm; and after modifying the constraint graph, discarding, using the at least one processor, each one of the plurality of proposed air missions that does not correspond to a connected subgraph of the modified constraint graph.

11. The method of claim 10 wherein the plurality of air mission constraints comprises targets, aircraft, bases, munitions, and units.

12. A method for solving an optimization problem having a plurality of constraints, the method being implemented by a computer including at least one processor and comprising the steps of:

creating, using the at least one processor, a constraint graph corresponding to the plurality of constraints of the optimization problem, wherein the constraint graph includes a node set and an edge set, wherein the constraint graph includes one or more subgraphs whose node set and edge set are subsets of the node set and the edge set of the constraint graph, and wherein potential feasible solutions correspond to one or more connected subgraphs;

using a genetic algorithm to generate a population, using the at least one processor, comprising a plurality of solutions to the optimization problem, the genetic algorithm having a plurality of iterations, wherein each one of the plurality of solutions to the optimization problem is consistent with each one of the plurality of constraints;

between iterations of the genetic algorithm, modifying the constraint graph by changing a first one of the plurality of constraints; and after modifying the first one of the plurality of constraints, removing, using the at least one processor, from the population each of the plurality of solutions in the population that does not correspond to a connected subgraph of the modified constraint graph.

13. The method of claim 12 wherein the step of modifying at least one of the plurality of constraints comprises replacing a pluggable constraint.

14. The method of claim 12 further comprising the step of replacing a pluggable component of the genetic algorithm.

15. The method of claim 12 further comprising the step of identifying irrelevant solution elements, and the step of using a genetic algorithm to generate a population comprising a plurality of solutions to the optimization problem further comprises the step of ignoring irrelevant solutions.

16. The method of claim 12 wherein the optimization problem comprises scheduling a plurality of air missions.

17. A system for solving an optimization problem having dynamic constraints, the system being implemented by a computer including at least one processor, one or more media storage means, and one or more user interfaces, the system comprising:

media storage means for retrievably storing a constraint graph corresponding to the plurality of dynamic constraints, wherein the constraint graph includes a node set and an edge set, wherein the constraint graph includes one or more subgraphs whose node set and edge set are subsets of the node set and the edge set of the constraint graph, and wherein potential feasible solutions correspond to one or more connected subgraphs;

media storage means for retrievably storing a plurality of solutions to the optimization problem, wherein each one of the plurality of solutions corresponds to a connected subgraph of the constraint graph;

user interface means for outputting one or more of the plurality of solutions;

user interface means for receiving a constraint graph modification;

means for implementing, by the at least one processor, the constraint graph modification in real time; and genetic algorithm means, implemented by the at least one processor, for optimizing solutions to the optimization problem by discarding, after modifying the constraint graph, each one of the plurality of solutions that does not correspond to a connected subgraph of the modified constraint graph.

18. The system of claim 17 wherein the optimization problem comprises scheduling a plurality of air missions.

19. A system for solving an optimization problem, comprising:

a memory coupled to a computer, the memory comprising a constraint graph corresponding to a plurality of dynamic constraints of the optimization problem, wherein the constraint graph includes a node set and an edge set, wherein the constraint graph includes one or more subgraphs whose node set and edge set are subsets of the node set and the edge set of the constraint graph, and wherein potential feasible solutions correspond to one or more connected subgraphs; and a processing unit coupled to the computer, said processing unit operative to use a genetic algorithm having a plurality of iterations to generate a plurality of candidate solutions to the optimization problem, each one of the plurality of candidate solutions corresponding to a connected subgraph of the constraint graph, wherein said processing unit is further operative to modify the constraint graph between iterations to reflect a change in at least one of said plurality of dynamic constraints that is triggered by a trigger event, and to optimize solutions to the optimization problem by discarding, after modifying the constraint graph, each one of the plurality of candidate solutions that does not correspond to a connected subgraph of the modified constraint graph.

20. The system of claim 19 wherein the genetic algorithm includes a pluggable component.

21. The system of claim 19 in which the memory further comprises a static constraint that is not represented in the constraint graph, and the processing unit is further operative to discard any candidate solution that does not comply with the static constraint.

22. The system of claim 21 in which the static constraint is pluggable.

23. The system of claim 19 wherein the optimization problem comprises scheduling a plurality of air missions.

24. A system for solving an optimization problem with a plurality of dynamic constraints, comprising:
- a computer comprising a processing unit;
- a memory coupled to the processing unit, the memory storing program instructions that when executed by the processor cause the processing unit to:
- create a constraint graph corresponding to the plurality of dynamic constraints of the optimization problem, wherein the constraint graph includes a node set and an edge set, wherein the constraint graph includes one or more subgraphs whose node set and edge set are subsets of the node set and the edge set of the constraint graph, and wherein potential feasible solutions correspond to one or more connected subgraphs;
- generate a plurality of solutions to the optimization problem using a genetic algorithm having a plurality of iterations;
- modify the constraint graph by changing a dynamic constraint between iterations of the genetic algorithm; and
- after modifying the constraint graph, discard each one of the plurality of solutions that does not correspond to a connected subgraph of the modified constraint graph.

25. The system of claim 24 in which the optimization problem comprises scheduling a plurality of air missions.

26. A computer readable storage medium comprising instructions for solving an optimization problem having a plurality of dynamic constraints by:
- creating a constraint graph corresponding to the plurality of dynamic constraints of the optimization problem, wherein the constraint graph includes a node set and an edge set, wherein the constraint graph includes one or more subgraphs whose node set and edge set are subsets of the node set and the edge set of the constraint graph, and wherein potential feasible solutions correspond to one or more connected subgraphs;
- generating a plurality of solutions to the optimization problem using a genetic algorithm having a plurality of iterations;
- modifying the constraint graph by changing one of the plurality of dynamic constraints, where the constraint graph is modified only between iterations of the genetic algorithm; and
- after modifying the constraint graph, discarding each one of the plurality of solutions that does not correspond to a connected subgraph of the modified constraint graph.

27. The computer readable storage medium of claim 26 in which the optimization problem comprises scheduling a plurality of air missions.

28. A method of solving an optimization problem comprising a plurality of dynamic constraints, the method being implemented by a computer including at least one processor and comprising the steps of:
- creating, using the at least one processor, a constraint graph corresponding to the plurality of dynamic constraints of the optimization problem, wherein the constraint graph includes a node set and an edge set, wherein the constraint graph includes one or more subgraphs whose node set and edge set are subsets of the node set and the edge set of the constraint graph, and wherein potential feasible solutions correspond to one or more connected subgraphs;
- generating, using the at least one processor, a plurality of solutions to the optimization problem using a genetic algorithm having an initial iteration and a plurality of subsequent iterations;
- modifying the constraint graph by changing one of the plurality of dynamic constraints, wherein the step of modifying the constraint graph occurs after the initial iteration of the genetic algorithm; and
- after modifying the constraint graph, discarding, using the at least one processor, each one of the plurality of solutions that does not correspond to a connected subgraph of the modified constraint graph.

29. The method of claim 28, wherein the step of modifying the constraint graph occurs between subsequent iterations of the genetic algorithm.

* * * * *